(12) United States Patent
Pastrick et al.

(10) Patent No.: US 6,902,306 B2
(45) Date of Patent: Jun. 7, 2005

(54) MIRROR ASSEMBLY SECURITY SYSTEM

(75) Inventors: Todd W. Pastrick, Spring Lake, MI (US); Mark R. Litke, Holland, MI (US); David K. Willmore, Holland, MI (US); Rick Mousseau, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/797,390

(22) Filed: Mar. 10, 2004

(65) Prior Publication Data

US 2004/0170025 A1 Sep. 2, 2004

Related U.S. Application Data

(63) Continuation of application No. 10/251,053, filed on Sep. 20, 2002, now Pat. No. 6,709,136, which is a continuation of application No. 09/962,835, filed on Sep. 25, 2001, now Pat. No. 6,494,602, which is a continuation of application No. 09/641,379, filed on Aug. 18, 2000, now Pat. No. 6,299,333, which is a continuation of application No. 09/174,757, filed on Oct. 19, 1998, now Pat. No. 6,149,287, which is a continuation of application No. 08/687,628, filed on Jul. 26, 1996, now Pat. No. 5,823,654, which is a continuation-in-part of application No. 08/607,284, filed on Feb. 26, 1996, now Pat. No. 5,669,704, which is a continuation of application No. 08/426,591, filed on Apr. 21, 1995, now Pat. No. 5,497,306, which is a continuation-in-part of application No. 08/333,412, filed on Nov. 2, 1994, now Pat. No. 5,497,305, which is a continuation of application No. 08/011,947, filed on Feb. 1, 1993, now Pat. No. 5,371,659.

(51) Int. Cl.[7] .................................................. F21S 4/00
(52) U.S. Cl. ........................ 362/494; 362/540; 362/548
(58) Field of Search ................................ 362/494, 492, 362/135, 136, 540, 495, 516, 520, 544, 543, 487, 548, 549; 340/475

(56) References Cited

U.S. PATENT DOCUMENTS

| | | | |
|---|---|---|---|
| 1,096,452 A | 5/1914 | Perrin | 362/495 |
| 1,278,741 A | 9/1918 | Phelps | 362/83.1 |
| 1,353,253 A | 9/1920 | Livingston et al. | 362/494 |

(Continued)

FOREIGN PATENT DOCUMENTS

| | | |
|---|---|---|
| DE | 2511406 | 9/1976 |
| DE | 2634372 | 2/1978 |
| DE | 3614882 | 11/1987 |
| DE | 3635473 A1 | 4/1988 |
| DE | 3635471 A1 | 5/1988 |
| DE | 3803510 | 9/1988 |
| DE | 9101029 | 5/1991 |
| DE | 4141208 | 6/1993 |
| DE | 94095663 | 9/1994 |
| DE | 4422572 | 1/1996 |
| DE | 19538771 A1 | 4/1997 |
| DE | 29702746 U1 | 5/1997 |
| EP | 738627 A2 | 10/1996 |
| EP | 0820900 | 1/1998 |

(Continued)

Primary Examiner—Thomas M. Sember
(74) Attorney, Agent, or Firm—Van Dyke, Gardner, Linn Burkhart, LLP

(57) ABSTRACT

A mirror assembly security system suitable for use in a vehicle comprises an exterior mirror assembly including a reflective element and a positioning device for adjustably positioning said reflective element. A light module is positioned substantially within the assembly and includes an enclosure having a light-transmitting opening generally facing downward when the exterior mirror assembly is mounted to a side of the vehicle. The light module includes a light source and a light-directing surface at least partially surrounding the light source. The light module projects a pattern of light from a bottom portion of the assembly to illuminate a ground area adjacent the vehicle in order to create a lighted security zone when said light source is electrically powered.

144 Claims, 22 Drawing Sheets

U.S. PATENT DOCUMENTS

| | | | |
|---|---|---|---|
| 1,458,703 A | 6/1923 | Harris et al. ................... 116/52 |
| 1,563,258 A | 11/1925 | Cunningham ............... 362/540 |
| 2,010,138 A | 8/1935 | Condon ....................... 177/329 |
| 2,273,570 A | 2/1942 | Greenlees ................... 362/501 |
| 2,295,176 A | 9/1942 | Kelly ........................ 362/83.1 |
| 2,457,348 A | 12/1948 | Chambers ................... 177/329 |
| 2,511,971 A | 6/1950 | Dalton ....................... 362/83.1 |
| 2,562,687 A | 7/1951 | Anderson ................... 362/100 |
| 3,522,584 A | 8/1970 | Talbot ........................ 340/98 |
| 3,596,079 A | 7/1971 | Clark ......................... 362/144 |
| 4,041,301 A | 8/1977 | Pelchat ....................... 362/100 |
| 4,143,368 A | 3/1979 | Route et al. ................. 340/543 |
| 4,205,325 A | 5/1980 | Haygood et al. ...... 340/870.11 |
| 4,258,352 A | 3/1981 | Lipschutz .................. 340/5.72 |
| 4,274,078 A | 6/1981 | Isobe et al. ................. 362/494 |
| 4,342,210 A | 8/1982 | Denningham ............... 70/278.1 |
| 4,446,380 A | 5/1984 | Moriya et al. ............. 307/10.4 |
| 4,475,100 A | 10/1984 | Duh ......................... 362/494 |
| 4,583,155 A | 4/1986 | Hart .......................... 362/285 |
| 4,661,800 A | 4/1987 | Yamazaki ................... 340/98 |
| 4,688,036 A | 8/1987 | Hirano et al. ............. 340/5.62 |
| 4,808,968 A | 2/1989 | Caine .......................... 340/71 |
| 4,809,137 A | 2/1989 | Yamada ..................... 362/494 |
| 4,851,970 A | 7/1989 | Bronder ....................... 362/66 |
| 4,866,417 A | 9/1989 | DeFino et al. .............. 340/429 |
| 4,881,148 A | 11/1989 | Lambropoulos et al. .... 361/172 |
| 4,890,907 A | 1/1990 | Vu et al. .................... 359/843 |
| 4,916,430 A | 4/1990 | Vu et al. .................... 340/463 |
| 5,014,167 A | 5/1991 | Roberts ...................... 362/494 |
| 5,017,903 A | 5/1991 | Krippelz, Sr. ............... 340/472 |
| 5,038,255 A | 8/1991 | Nishihashi et al. ......... 362/503 |
| 5,049,867 A | 9/1991 | Stouffer ................. 340/426.17 |
| 5,059,015 A | 10/1991 | Tran .......................... 359/844 |
| 5,109,214 A | 4/1992 | Heidman, Jr. ............... 340/475 |
| 5,113,182 A | 5/1992 | Suman et al. ............... 340/5.28 |
| 5,132,882 A | 7/1992 | Alder ......................... 362/503 |
| 5,151,824 A | 9/1992 | O'Farrell .................... 359/604 |
| 5,179,471 A | 1/1993 | Caskey et al. .............. 359/603 |
| 5,206,562 A | 4/1993 | Matsuno et al. ............. 315/77 |
| 5,207,492 A | 5/1993 | Roberts ........................ 362/30 |
| 5,303,130 A | 4/1994 | Wei et al. ................... 362/494 |
| 5,313,335 A | 5/1994 | Gray et al. ................. 362/547 |
| 5,371,659 A | 12/1994 | Pastrick et al. ............. 362/494 |
| 5,402,103 A | 3/1995 | Tashiro ....................... 340/475 |
| 5,436,741 A | 7/1995 | Crandall ....................... 359/15 |
| 5,497,305 A | 3/1996 | Pastrick ..................... 362/83.1 |
| 5,497,306 A | 3/1996 | Pastrick ..................... 362/494 |
| 5,499,169 A | 3/1996 | Chen ......................... 362/83.1 |
| 5,587,699 A | 12/1996 | Faloon et al. ............... 340/475 |
| 5,624,176 A | 4/1997 | O'Farrell et al. .......... 362/83.1 |
| 5,660,457 A | 8/1997 | Lyons ....................... 362/83.1 |
| 5,669,699 A | 9/1997 | Pastrick et al. ............. 362/83.1 |
| 5,669,704 A | 9/1997 | Pastrick ..................... 362/83.1 |
| 5,669,705 A | 9/1997 | Pastrick et al. ............. 362/83.1 |
| 5,823,654 A | 10/1998 | Pastrick et al. ............. 362/83.1 |
| 5,863,116 A | 1/1999 | Pastrick et al. ............. 362/494 |
| 5,871,275 A | 2/1999 | O'farrel et al. ............. 362/494 |
| 5,879,074 A | 3/1999 | Pastrick ..................... 362/494 |
| 6,045,243 A | 4/2000 | Muth et al. ................. 362/494 |
| 6,074,077 A | 6/2000 | Pastrick et al. ............. 362/494 |
| 6,086,229 A | 7/2000 | Pastrick ..................... 362/494 |
| 6,099,153 A | 8/2000 | Zimmermann et al. ..... 362/494 |
| 6,139,171 A | 10/2000 | Waldmann ................. 362/494 |
| 6,149,287 A | 11/2000 | Pastrick et al. ............. 362/494 |
| 6,176,602 B1 | 1/2001 | Pastrick et al. ............. 362/494 |
| 6,250,783 B1 | 6/2001 | Stidham et al. ............. 362/494 |
| 6,276,821 B1 | 8/2001 | Pastrick et al. ............. 362/494 |
| 6,280,067 B1 | 8/2001 | Albou ....................... 362/494 |
| 6,280,069 B1 | 8/2001 | Pastrick et al. ............. 362/494 |
| 6,296,379 B1 | 10/2001 | Pastrick ..................... 362/494 |
| 6,299,333 B1 | 10/2001 | Pastrick et al. |
| 6,416,208 B2 | 7/2002 | Pastrick et al. ............. 362/494 |
| 6,474,853 B2 | 11/2002 | Pastrick et al. |
| 6,494,602 B2 | 12/2002 | Pastrick et al. ............. 362/494 |
| 6,568,839 B1 | 5/2003 | Pastrick et al. ............. 362/494 |
| 6,685,348 B2 | 2/2004 | Pastrick et al. ............. 362/494 |

FOREIGN PATENT DOCUMENTS

| | | |
|---|---|---|
| FR | 1461419 | 12/1966 |
| FR | 2612136 | 9/1988 |
| FR | 2618397 | 1/1998 |
| GB | 1555541 | 11/1979 |
| GB | 2129749 | 5/1984 |
| GB | 2154969 | 9/1985 |
| GB | 2161440 A | 1/1986 |
| GB | 2266870 | 11/1993 |
| GB | 2275329 A | 8/1994 |
| GB | 2161440 A | 1/1996 |
| GB | 2316379 A | 2/1998 |
| JP | 58188733 | 11/1983 |
| JP | 0188242 | 8/1986 |
| JP | 62191246 A | 8/1987 |
| JP | 0218248 | 9/1987 |
| JP | 62218248 | 9/1987 |
| JP | 0239273 | 9/1989 |
| JP | 1239273 | 9/1989 |
| JP | 3050044 | 4/1991 |
| JP | 8142745 A | 6/1996 |
| JP | 61188242 | 8/1996 |
| JP | 9095177 | 4/1997 |
| WO | WO8901425 | 2/1989 |
| WO | WO9010555 | 9/1990 |

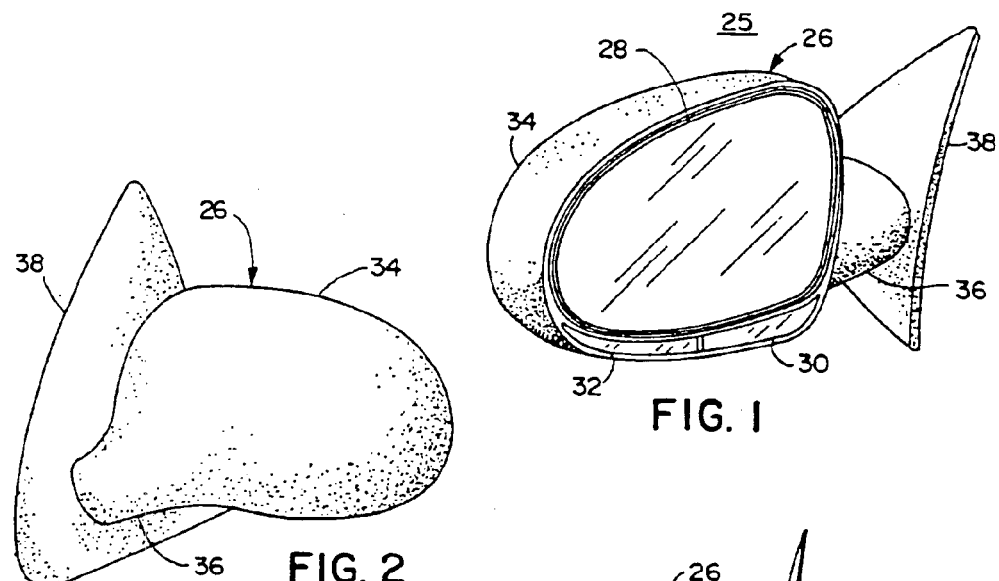
FIG. 1
FIG. 2
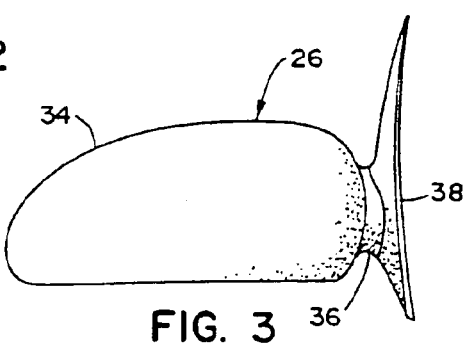
FIG. 3
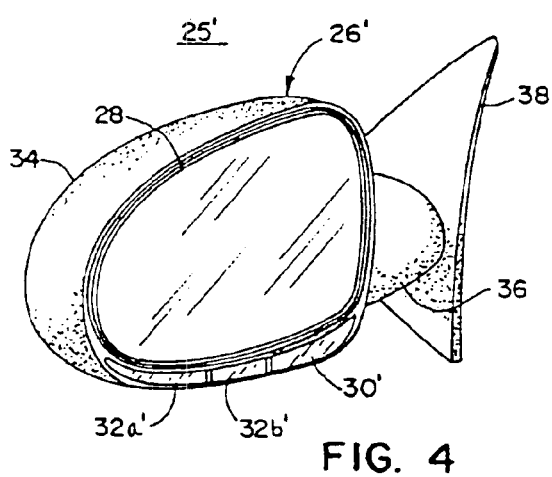
FIG. 4

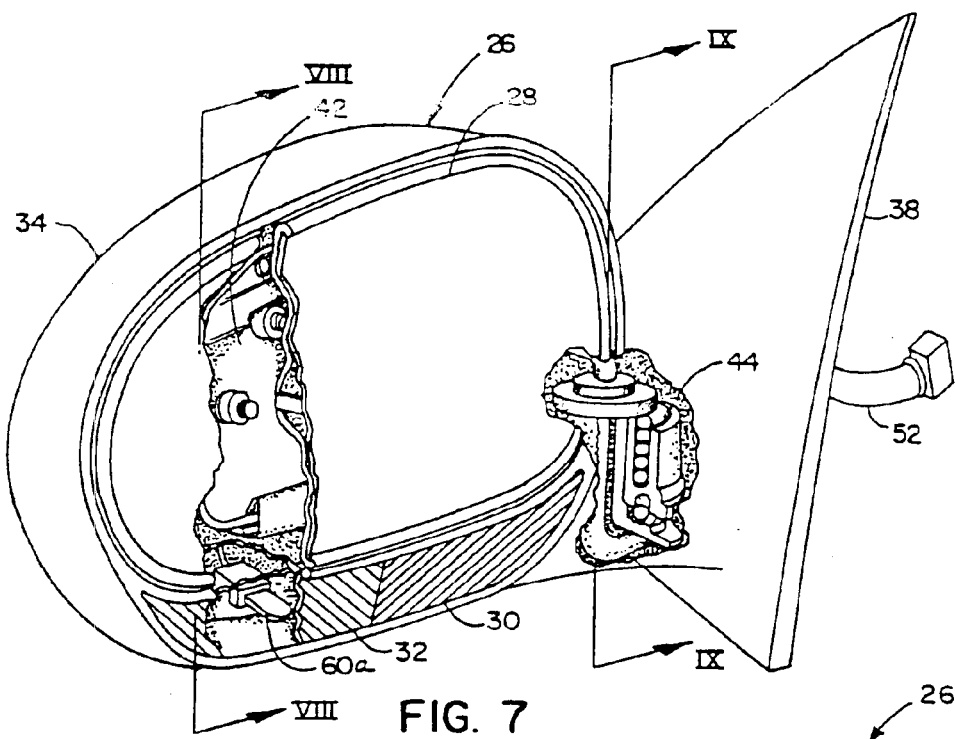
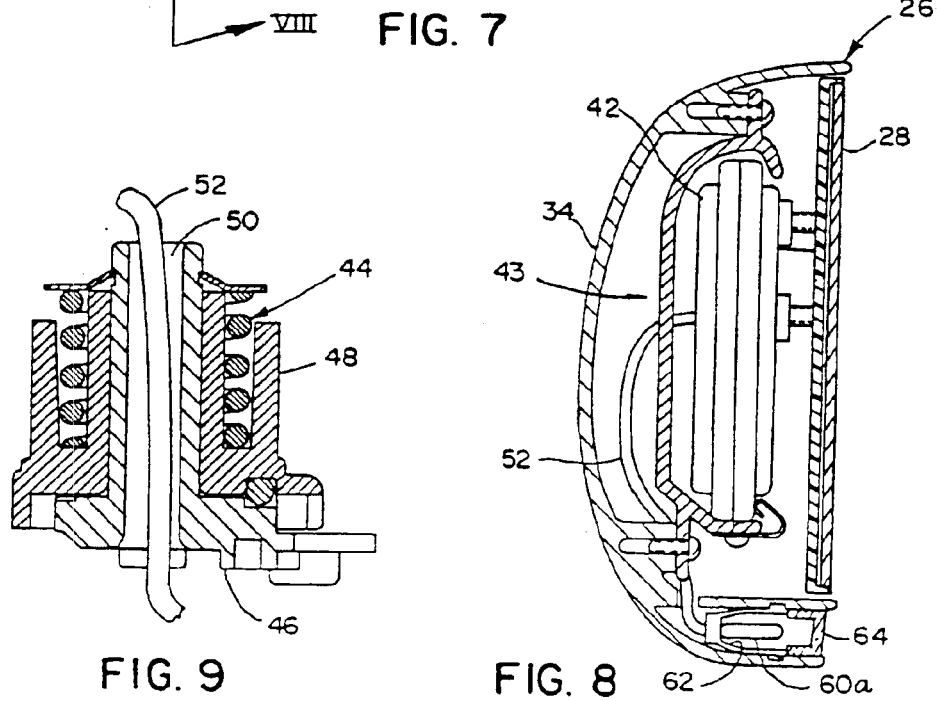

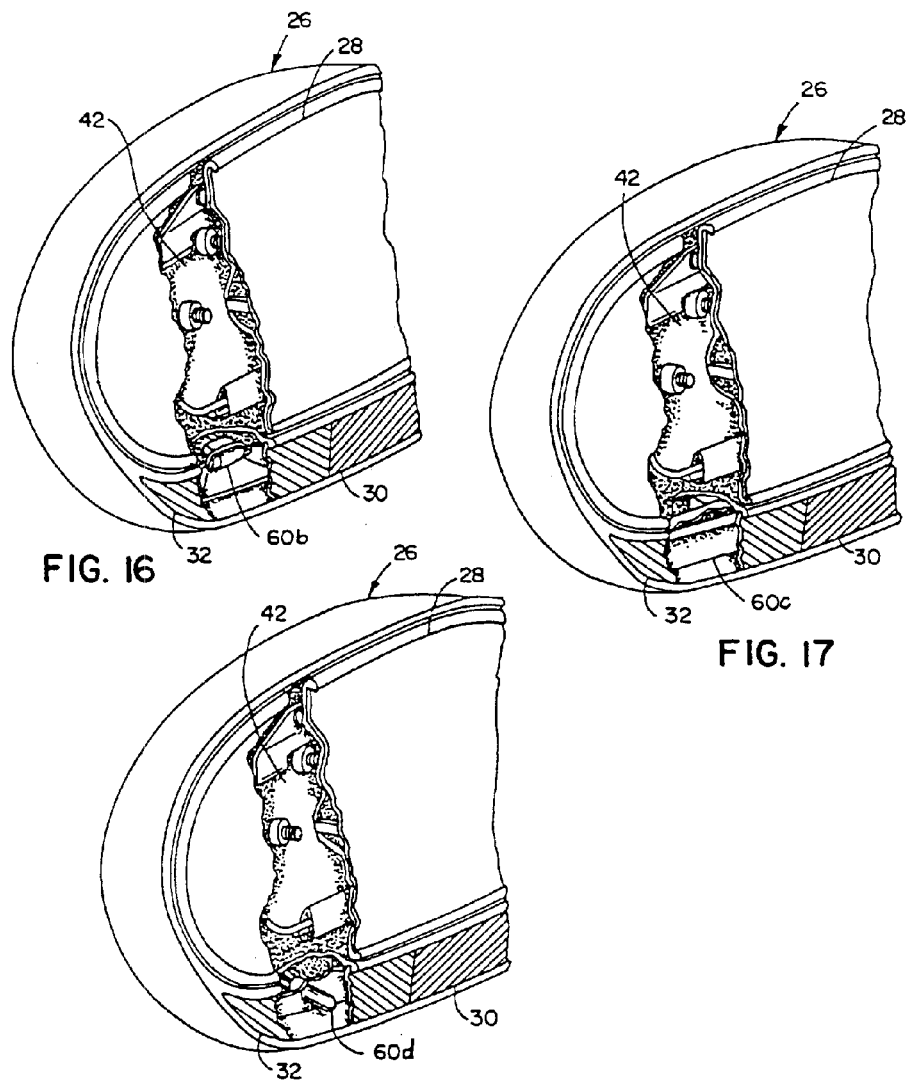

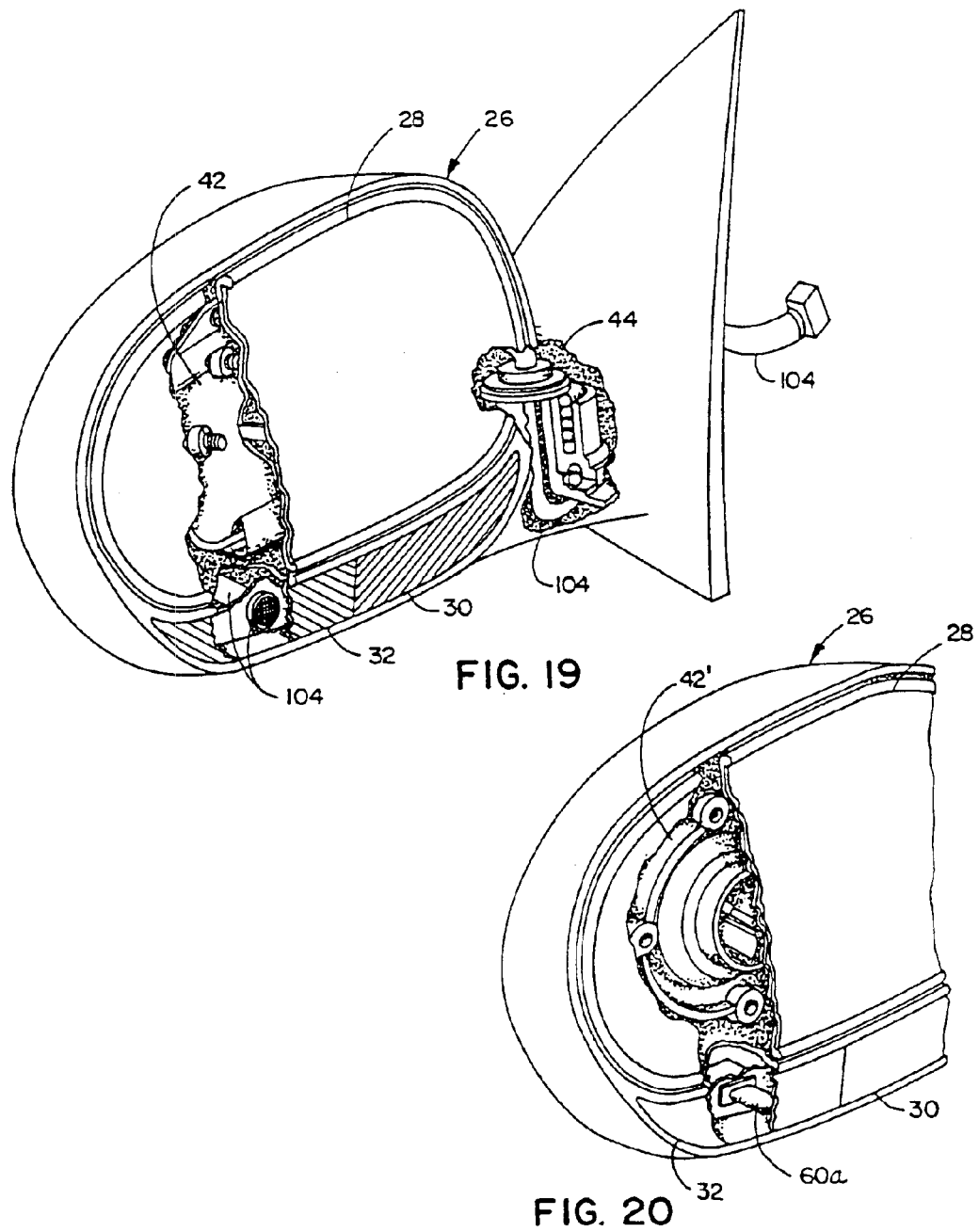

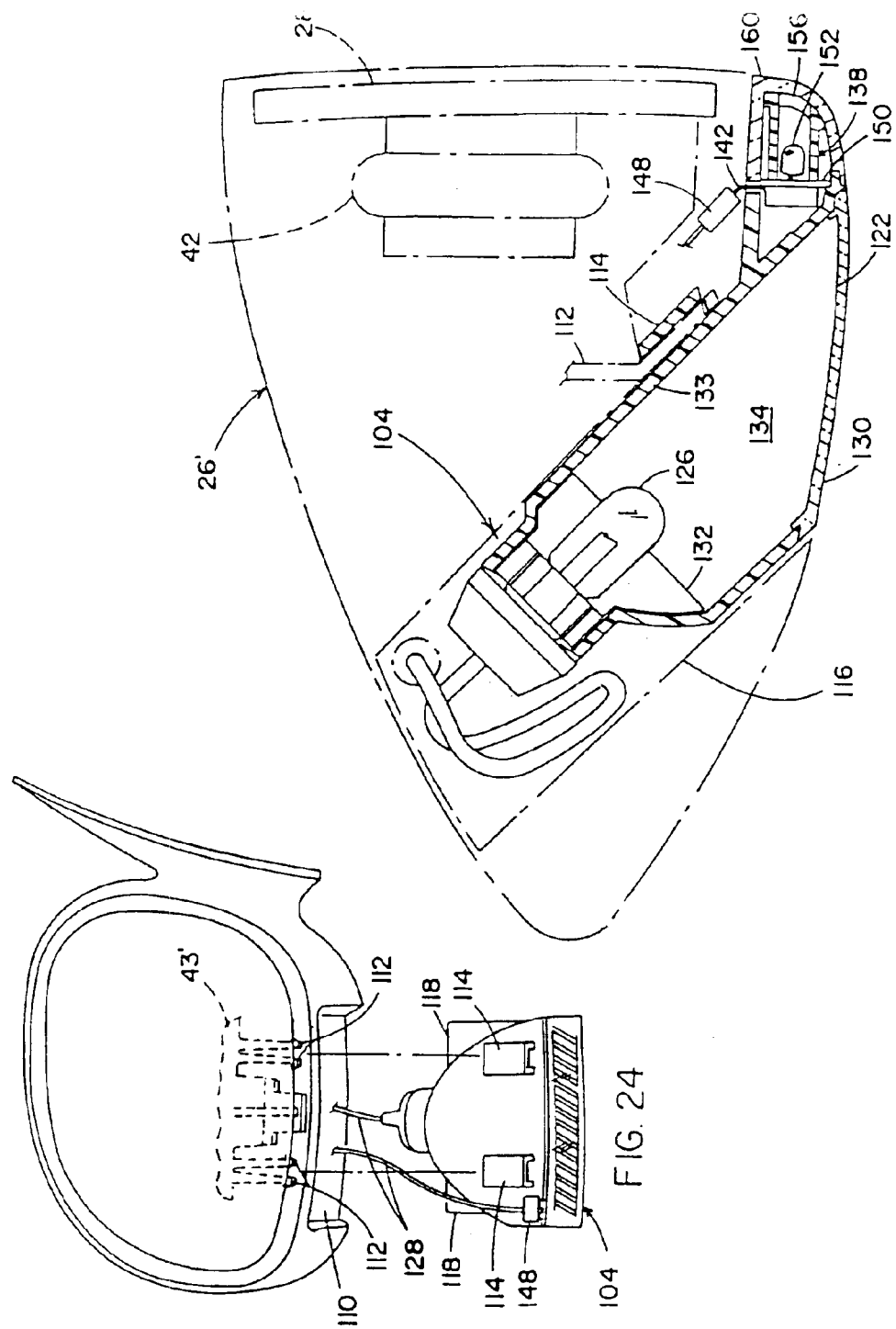

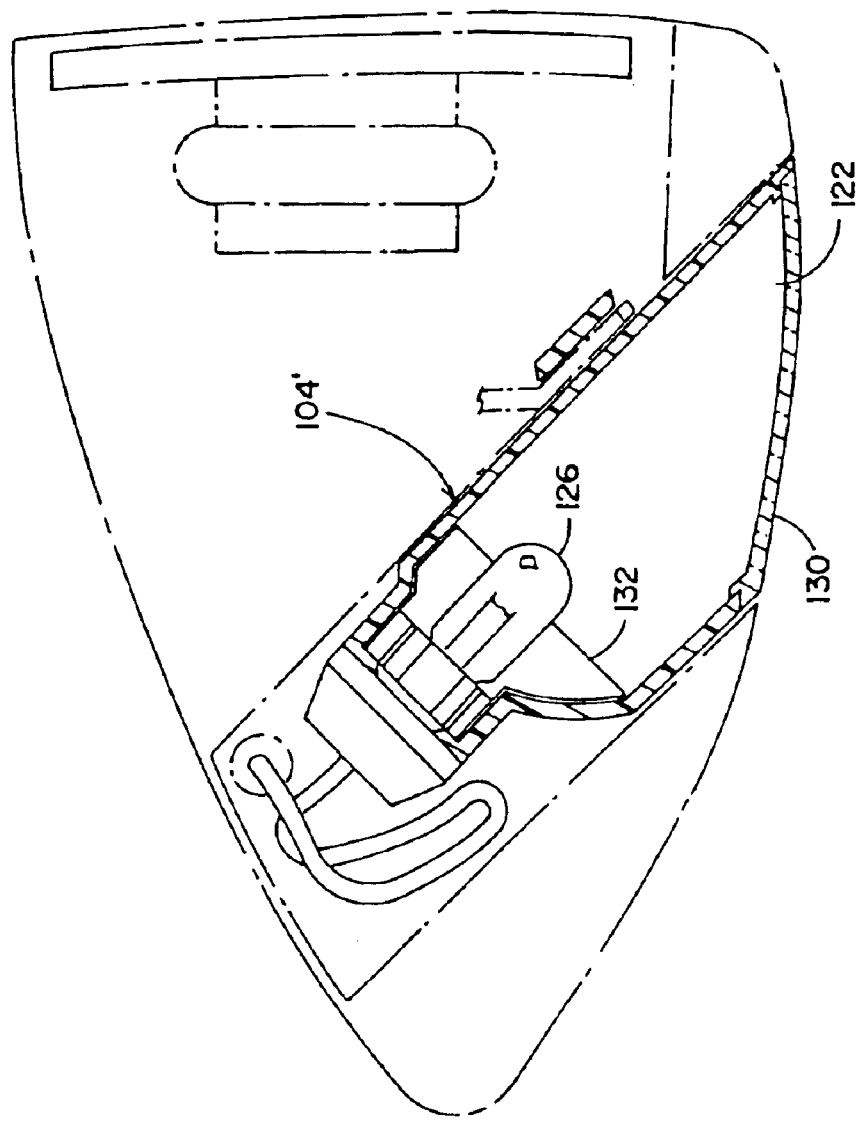

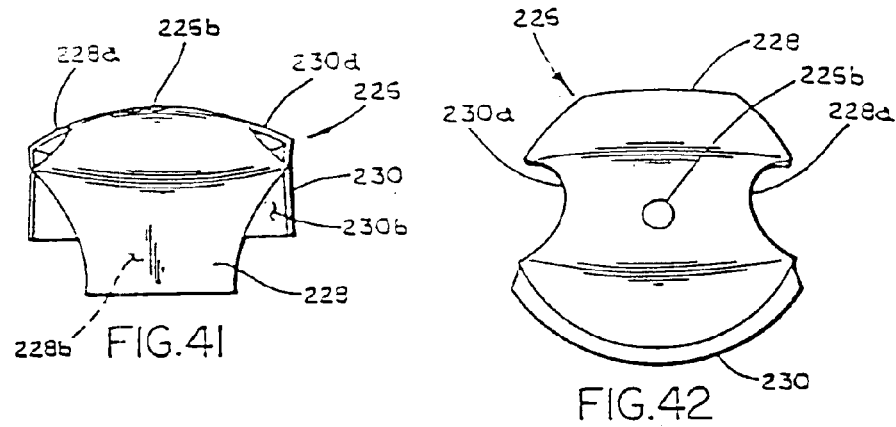
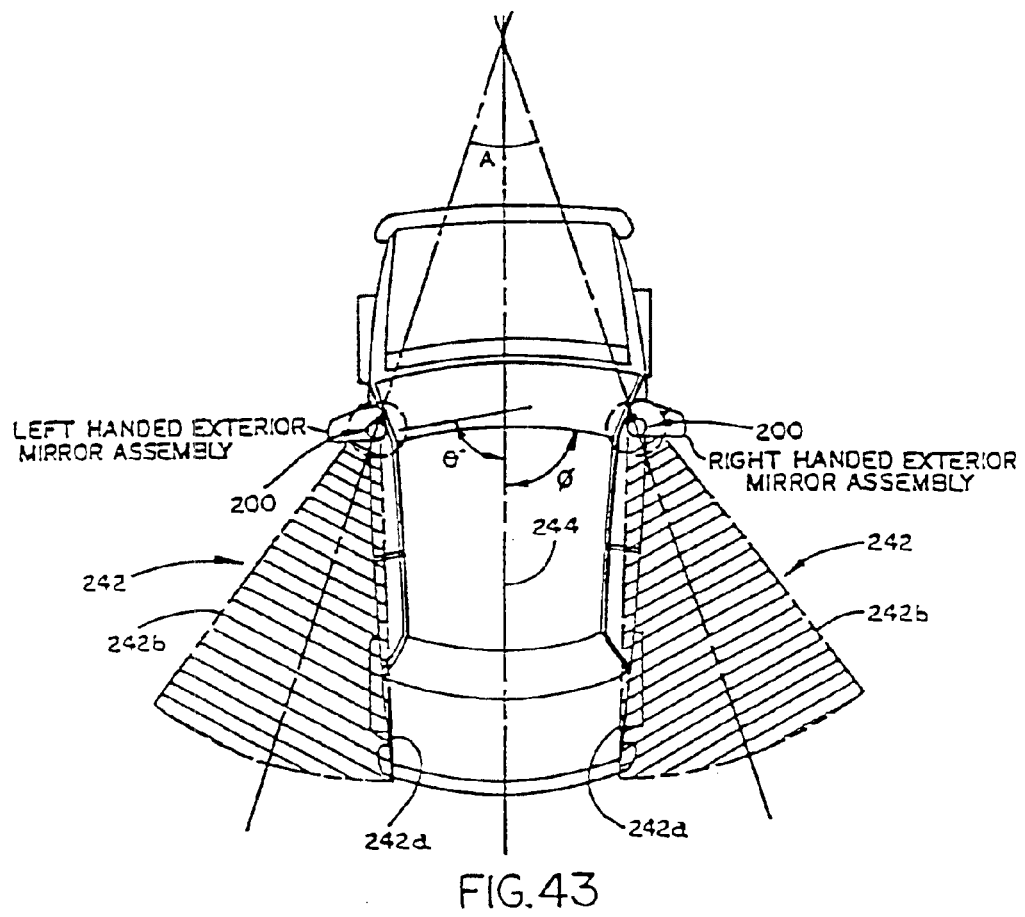

MIRROR ASSEMBLY SECURITY SYSTEM

RELATED APPLICATIONS

This application is a continuation of application Ser. No. 10/251,053, filed Sep. 20, 2002 U.S. Pat. No. 6,709,136, by Todd Pastrick, Mark R. Litke, David K. Willmore, and Rick Mousseau, entitled LIGHTED EXTERIOR MIRROR SYSTEM, which his a continuation application of application Ser. No. 09/962,835, filed Sep. 25, 2001, by Todd Pastrick, Mark R. Litke, David K. Willmore, and Rick Mousseau, entitled UNIVERSAL EXTERIOR VEHICLE SECURITY LIGHT, now U.S. Pat. No. 6,494,602, which is a continuation of Ser. No. 09/641,379, filed Aug. 18, 2000, now U.S. Pat. No. 6,299,333, which is a continuation of application Ser. No. 09/174,757, filed on Oct. 19, 1998, now U.S. Pat. No. 6,149,287, which is a continuation of application Ser. No. 08/687,628, filed Jul. 26, 1996, now U.S. Pat. No. 5,823,654, which is a continuation-in-part of application Ser. No. 08/607,284, filed Feb. 26, 1996, now U.S. Pat. No. 5,669,704, which is continuation of application Ser. No. 08/426,591, filed Apr. 21, 1995, now U.S. Pat. No. 5,497,306, which is a continuation-in-part of application Ser. No. 08/333,412, filed Nov. 2, 1994, now U.S. Pat. No. 5,497,305, which is a continuation of application Ser. No. 08/011,947, filed Feb. 1, 1993, now U.S. Pat. No. 5,371,659, the disclosures of which are hereby incorporated by reference herein in their entireties.

BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

In order to include a security light system in a vehicle exterior mirror assembly, the security light must be rugged and resistant to environmental conditions such as water splash from road surfaces, rain and other precipitation as well as car washes. The assembly desirably must additionally be of relatively low cost and easy to manufacture in order to be acceptable to vehicle manufacturers. In addition, the security light desirably must be capable of matching a multiplicity of mirror housing designs. Moreover, the security light desirably is compact so as to fit into the interior cavity of conventional exterior mirror housings. For styling and aerodynamic reasons, exterior mirror housings are of determined and restricted size, shape, design, and interior volume. Moreover, the interior volume is already typically relatively cramped as it must accommodate not only the mirror reflector element itself and its movement, but also usually a manual or electric actuator that allows adjustment of the rearward field of view of the reflector remotely by the driver from the interior cabin of the vehicle. Also, since it is commercially desirable for a manufacturer of a security light to supply to a multitude of exterior mirror manufacturers, for their incorporation into their own particular exterior mirror assembly construction, it is desirable that the light be of a module type that is compact; that is weatherproofed; that is attachable and receivable by a wide variety of exterior mirror assembly designs; that is readily, standardly, and conveniently connectable to the vehicle electrical service and wiring already commonly found in conventional exterior mirror assemblies; and that is economic both for manufacture by the light module manufacturer and for the manufacturer of the complete exterior mirror assembly who will incorporate the light module into a mirror housing.

Importantly, the security light must be easy to service. The vehicle repair technician must be provided with easy access to the light source in order to replace the light source during the useful life of the vehicle. Furthermore, the light source should be replaceable without removing and subsequently replacing numerous fasteners. Such fasteners are not only time-consuming to remove and replace, but are subject to getting lost as well as damaged.

Additionally, it would be desirable to provide a security light system having a light module designed which could be universally adaptable to the exterior mirrors on both sides of the vehicle. The task is complicated because the light pattern illuminating the ground, such as adjacent the front and rear doors, on one side of the vehicle is generally desirably a mirror image of the ground illumination light pattern on the other side of the vehicle. Both light patterns extend outwardly from the respective side of the vehicle to a lateral outer boundary, but in opposite directions. However, the use of a light module that can produce the desired ground illumination light pattern in the respective driver's side and passenger's side is further complicated because the angle defined by the exterior mirror assembly case housing that contains the respective light module with respect to the center line on the vehicle is not necessarily the same for the driver's side mirror assembly as the passenger side mirror assembly. The mounting angle $\phi$ between the casing face of the passenger side outside mirror assembly and the vehicle center line is often smaller than the mounting angle $\theta$ between the casing face of the driver side assembly and the vehicle center line. Typically, $\theta$, which is the drivers side angle, is between approximately 70° and 90°. Typically $\phi$, which is the passenger side angle is between 5° and 15° less than the corresponding angle $\theta$ on the same vehicle. Thus, a light module mounted identically into two otherwise identical mirror case housings can irradiate different areas on the left and right hand side of the vehicle when these housings are mounted on the vehicle simply because angles $\theta$ and $\phi$ differ on the vehicle.

It would also be desirable to provide a light module design which could be universally adaptable in many vehicles designed by different manufacturers. This task is complicated by the wide range of designs of exterior mirrors in various vehicles. It is an onerous task to provide a light module which can be incorporated into virtually any exterior mirror design because extra space in such mirrors is often very limited.

The security light system should be compact and replaceable so that it can either be serviced or simply replaced. For a disposable light module, the cost of manufacture must be sufficiently low enough to warrant the light module to be removed and replaced in its entirety. Most or all of the above requirements must be met in order to have a commercially viable vehicle exterior mirror assembly security system suitable for use on a vehicle, such as an automobile. Indeed, the Applicants do not know of any successful commercial incorporation of a light module into an exterior mirror assembly on an automobile and believe that their inventions are the first commercially successful applications of a light module suitable for use in the exterior mirror assembly on an automobile.

SUMMARY OF THE INVENTION

The present invention is intended to provide a personal safety feature for a vehicle in the form of a light adapted to projecting light generally downwardly on an area adjacent a portion of the vehicle in order to create a lighted security zone in the area. Advantageously, the light, that preferably provides a security function, is provided as a module that is suitable for use in the exterior mirror housing designs of various vehicles. The light module is capable of low cost, easy manufacture. Furthermore, the module is compact and is substantially moisture impervious in order to resist environmental forces.

The security system is adapted to projecting a pattern of light from the exterior mirror housing on an area adjacent a portion of the vehicle that extends laterally onto the vehicle and downwardly and rearwardly of the vehicle. In this manner, a security zone is established in the vicinity of the vehicle doors where occupants enter and exit the vehicle.

According to an aspect of the invention, a mirror assembly security system includes an exterior mirror assembly having a reflective element and a casing for the reflective element. The casing includes means defining a mounting surface and a cooperative member associated with the mounting surface. The security system further includes a light module positioned in the mirror assembly for projecting light from the mirror assembly on an area in order to create a lighted security zone in that area. The light module according to this aspect of the invention includes an enclosure, a light-transmitting opening in the enclosure, a light source supported in the enclosure for radiating light through the light-transmitting opening and a cover for the light-transmitting opening. The light module further includes a positioning member mating with the cooperating member of the mirror assembly in order to orient the enclosure at a given orientation with respect to the mounting surface.

In this manner, the same light module design may be utilized on both sides of the vehicle not withstanding that the light modules generate light patterns which are different on different sides of the vehicle. The light modules can be oriented in order to orient the light pattern in a manner which is appropriate for the respective side of the vehicle.

According to another aspect of the invention, a light module for positioning in an opening in an exterior mirror assembly of a vehicle includes a housing, a pair of electrical contacts disposed on an inner surface of a housing wall, a light-transmitting opening in the housing and a cover extending over the light-transmitting opening. A light source is supported by the contacts in a manner which radiates light towards the light-transmitting opening. The housing wall and portions of the contacts on the housing wall are flexible and are adapted to deflect prior to installation of the cover. This permits insertion of the light source between the housing walls. The cover adds rigidity to the housing wall when it is installed on the vehicle so that the light source is rigidly supported in the enclosure between the contacts when the cover is installed. This aspect of the invention comprehends the provision of a light module which will be replaceable in its entirety wherein, once inserted in the housing, the light source will not be individually replaced. However, the light source is easily inserted in the housing and, when the housing assembly is complete, is securely retained in the supporting electrical contacts.

According to another aspect of the invention, a security light module for an exterior mirror assembly for a vehicle includes a housing defining a compartment. The housing has a unitary body including a side wall and a light emitting opening in communication with the compartment. The compartment defines a central axis and a light source is provided having an elongated radiating surface which is mounted in the compartment symmetrically with respect to the central axis. A reflective surface is provided which at least partially straddles the light source. A cover seals the compartment and is adapted to transmit light from the light source. The reflective surface and/or the cover individually or in combination direct light from the light source in a direction generally downwardly and rearwardly of the vehicle and outwardly from the respective sides of the vehicle. In this manner, the light module does not need to be oriented in the exterior mirror housing with the compartment directed in the general direction in which the light pattern is directed. This provides a more compact light module which may be oriented in the exterior mirror housing in a manner required in order to direct the light pattern in a desired manner which is contemplated to be different depending upon the side of the vehicle on which the light module is mounted.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The invention, further, conveniently combines a signal light that acts in unison with the vehicle's turn signal, brake light, or both, with the security light, or as a stand-alone accessory, in an exterior mirror assembly. The signal light may be designed to be observed by other vehicles passing the equipped vehicle but not directly by the driver of the equipped vehicle.

These and other objects, advantages and features of this invention will become apparent upon review of the following specification in conjunction with the drawings.

BRIEF DESCRIPTION OF THE DRAWINGS

FIG. 1 is a perspective view taken from the front of a mirror assembly (rear of the vehicle) incorporating the invention;

FIG. 2 is a rear view of the mirror assembly in FIG. 1;

FIG. 3 is a top view of the mirror assembly in FIG. 1;

FIG. 4 is the same view as FIG. 1 of an alternative embodiment of the invention;

FIG. 7 is a breakaway perspective view of the system in FIG. 1 revealing internal components thereof;

FIG. 8 is a sectional view taken along the lines VIII—VIII in FIG. 7;

FIG. 9 is a sectional view taken along the lines IX—IX in FIG. 7;

FIG. 16 is the same view as FIG. 7 of a first alternative light source according to the invention;

FIG. 17 is the same view as FIG. 7 of a second alternative light source;

FIG. 18 is the same view as FIG. 7 of a third alternative light source;

FIG. 19 is the same view as FIG. 7 of a fourth alternative light source;

FIG. 20 is the same view as FIG. 7 of the invention embodied in an alternative mirror structure;

FIG. 23 is a sectional view taken along the lines XXIII—XXIII in FIG. 22;

FIG. 24 is a front elevation of the mirror assembly in FIGS. 21 and 22 illustrating the manner in which a light module is removably mounted to an exterior rearview mirror housing;

FIG. 25 is the same view as FIG. 23 of an alternative embodiment;

FIG. 41 is a front elevational view of the reflective member;

FIG. 42 is a top plan view of the reflective member of FIG. 40; and

DESCRIPTION OF THE PREFERRED EMBODIMENT

Figure 5:
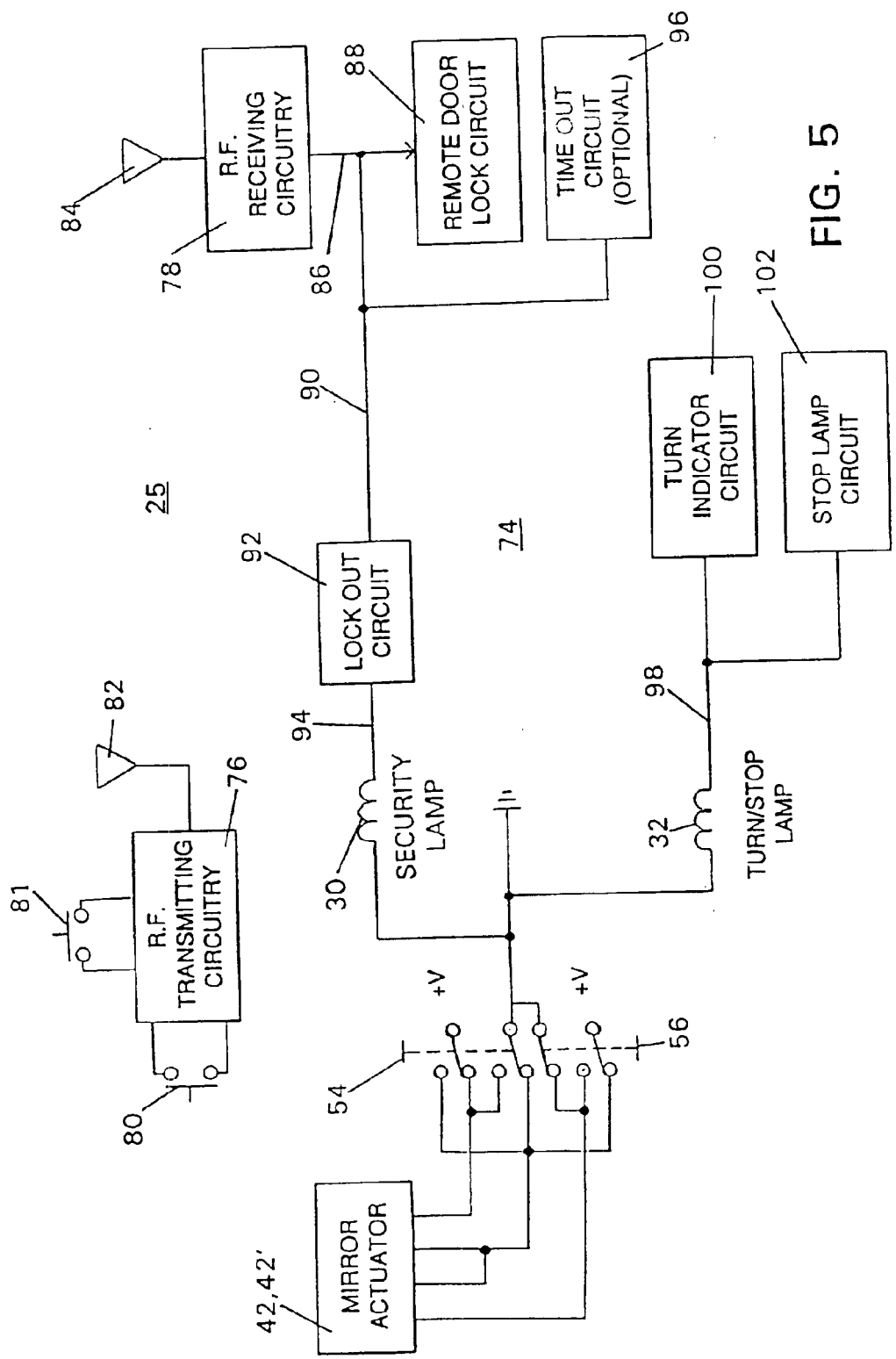
FIG. 5 is a block diagram of a control system according to the invention.

Referring now specifically to the drawings, and the illustrative embodiments depicted therein, a vehicle personal security lighting system 25 includes an exterior mirror assembly 26 having a conventional reflectance element 28, a security light 30, preferably white, or clear, and a signal light 32, preferably red or red-orange, incorporated in a housing, or casing, 34. Casing 34 is connected by a neck 36 to a stationary panel or sail 38 adapted for incorporation with the forward portion of the vehicle side window assembly, and which mounts mirror assembly 26 to the door of a vehicle 40 (see FIG. 10). Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied thereacross as disclosed in U.S. Pat. No. 5,151,824, the disclosure of which is hereby incorporated by reference herein.

With reference to FIGS. 7 and 8, as is conventional, reflectance element 28 is mounted to a bracket 43 by a positioning device such as an actuator 42. Casing 34 is mounted to bracket 43. Actuator 42 provides remote positioning of reflectance element 28 on two orthogonal axes. Such actuators are well known in the art and may include a jackscrew-type actuator 42 such as Model No. H16-49-8001 (right-hand mirror) and Model No. H16-49-8051 (left-hand mirror) by Matsuyama of Kawagoe City, Japan, as illustrated in FIG. 7, or a planetary-gear actuator 42' such as Model No. 540 (U.S. Pat. No. 4,281,899) sold by Industrie Koot BV (IKU) of Montfoort, Netherlands, as illustrated in FIG. 20. As is also conventional, the entire casing 34 including actuator 42, 42' is mounted via bracket 43 for breakaway motion with respect to stationary panel 38 by a breakaway joint assembly 44. Breakaway joint assembly 44 (FIG. 9) includes a stationary member 46 attached to vehicle 40, a pivoting member 48 to which bracket 43 and casing 34 are attached, and a wire-way 50 through which a wire cable 52 passes. Wire cable 52 includes individual wires to supply control signals to actuator 42, 42', as well as signals to control the level of reflectivity, if reflective element 28 is of the variable reflectivity type noted above, such as an electrochromic mirror. Power may also be supplied through cable 52 for a heater 53 as disclosed in U.S. Pat. No. 5,151,824 in order to evaporate ice and dew from reflective element 28.

With reference to FIG. 5, actuator 42, 42' receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Figure 10:
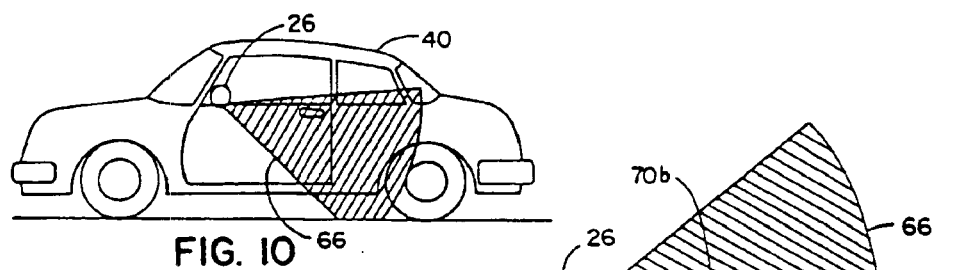
FIG. 10 is a side elevation of a vehicle illustrating the security zone light pattern generated by a security light according to the invention.
Figure 11:
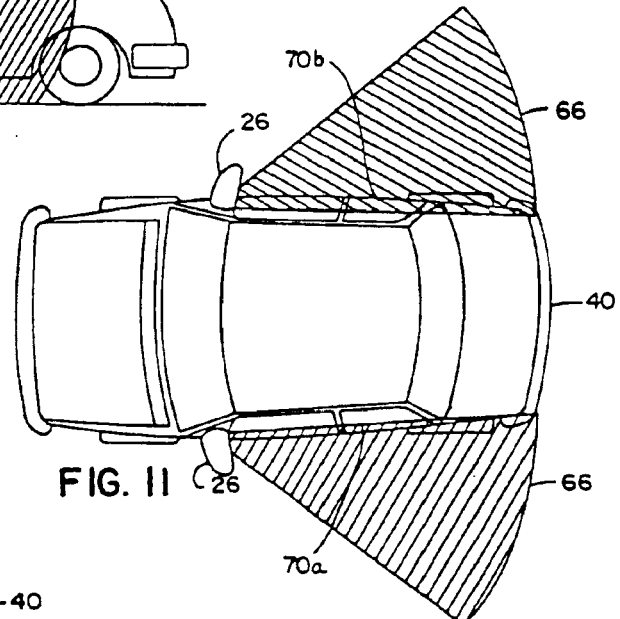
FIG. 11 is a top plan view of the vehicle and light pattern in FIG. 10.
Figure 12:
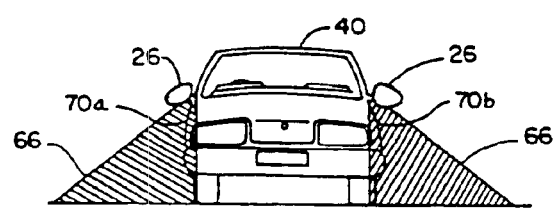
FIG. 12 is a rear elevation of the vehicle and light pattern in FIG. 10.

Each of the security light 30 and signal light 32 includes a light source 60 and reflector 62 behind a lens 64 (FIG. 8). Light source 60, reflector 62 and lens 64 are designed for security light 30 to project a pattern 66 of light, such as white light, through a clear, non-filtering lens, in order to establish a security zone around the vehicle (FIGS. 10–12). Pattern 66 extends rearward from mirror assembly 26. Vertically, pattern 66 contacts the ground at 68 in the vicinity of entry and exit by the vehicle occupants (FIGS. 10 and 12). Laterally, pattern 66 fans out into contact with the side 70a, 70b of the vehicle. This contact washes the sides of the vehicle to reflect the light in order to further illuminate the area in order to establish the security lighting zone (FIGS. 11 and 12). In a preferred embodiment, pattern 66 extends rearwardly from mirror assembly 26 without projecting any portion of the pattern forwardly of the mirror assembly.

Figure 13:
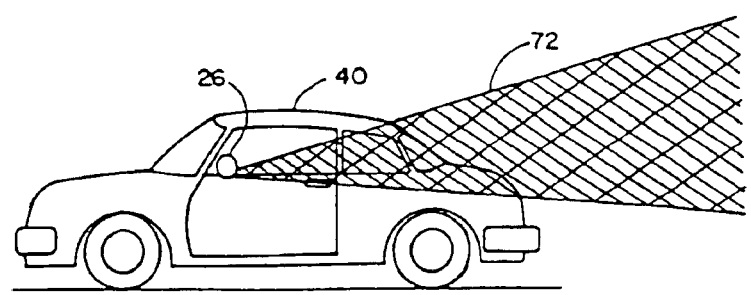
FIG. 13 is a side elevation of a vehicle illustrating the light pattern generated by a signal light useful with the invention.
Figure 14:
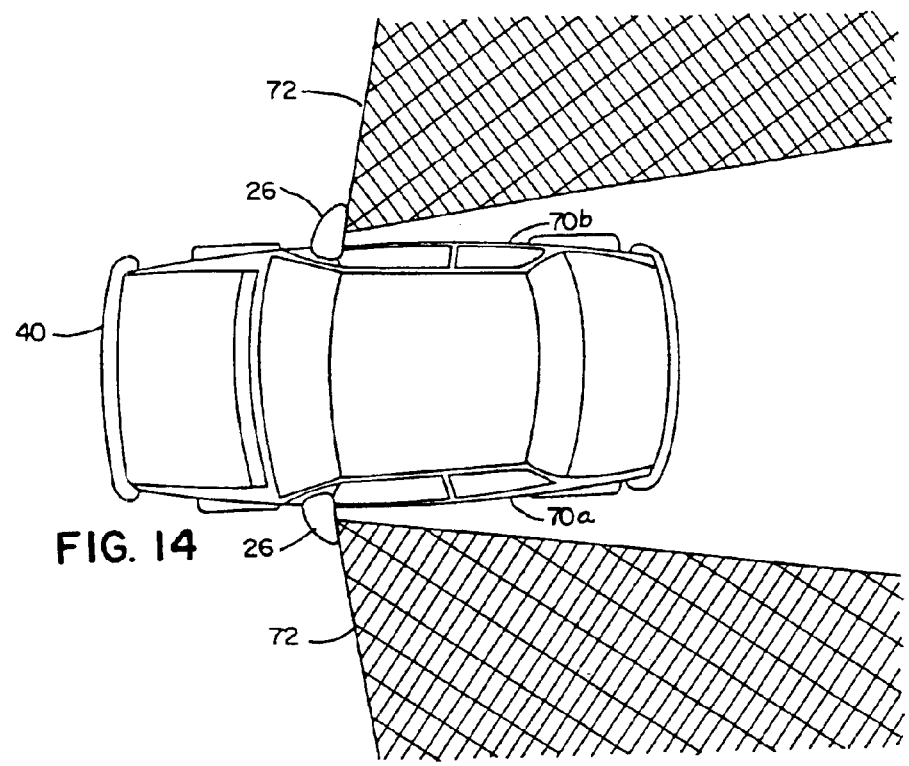
FIG. 14 is a top plan view of the vehicle and light pattern in FIG. 13.
Figure 15:
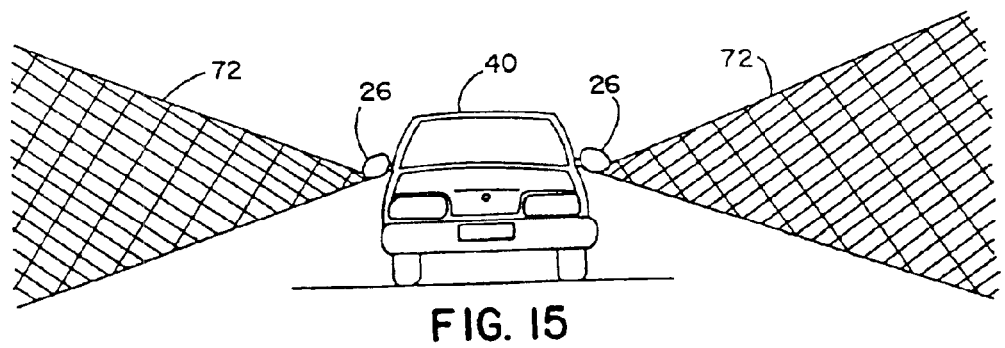
FIG. 15 is a rear elevation of the vehicle and light pattern in FIG. 13.

Signal light 32 generates a light pattern 72, which is directed generally horizontally rearwardly of vehicle 40 (FIGS. 13–15). Pattern 72 is laterally directed substantially away from side 70a, 70b of vehicle 40 so that the driver of vehicle 40 does not directly intercept pattern 72, although a minor intensity (such as 10%) of the pattern is intercepted by the driver in order to provide awareness of the actuating of the signal light. Pattern 72 fans laterally away from side 70a, 70b to an extent that is parallel the face of reflectance element 28, which is substantially perpendicular to side 70a, 70b (FIG. 14). Thus, the driver of another vehicle (not shown) passing vehicle 40 on the left or right side of vehicle 40 will intercept pattern 72 while the vehicle is behind and beside vehicle 40. Although, in the illustrated embodiment, lens 64 of signal light 32 is substantially planar, lens 64 of signal light 32 could be made to wrap around the outward side of casing 34 in order to function as a side marker for the vehicle as is required in some European countries.

Vehicle mirror assembly security system 25 is actuated by a control system 74 (FIG. 5). Control system 74 includes means for actuating security light 30 including a remote transmitting device 76 and a stationary receiving device 78. Transmitting device 76 may be remotely carried by the vehicle operator and includes switches 80 and 81 in order to actuate the transmitting circuitry to transmit a signal from antenna 82, which is received by antenna 84 of receiving device 78. Receiving device 78 is mounted in the vehicle, such as in the vehicle trunk compartment, interior cabin, or within or on a mirror assembly, and includes an output 86 in order to operate remote door lock circuit 88, as is conventional. For example, an antenna, such as a metallic antenna comprising, for example, 6 to 20 gauge copper wire, and/or an RF, IR, and the like signal receiving circuit, may be incorporated into one, and preferably both, of the exterior mirror assemblies, or into the interior mirror assembly, or into vehicle glazing, trim items such as sunvisors and overhead consoles, and their like. Such an antenna can be auxiliary mounted, integrally mounted, or insert molded into or onto, for example, the exterior mirror bracket, sail, housing, bezel, or visor, or could be part of the light module. Such receiving system can be of the automatic, proximity detection type that automatically senses proximity and approach of the vehicle owner by its automatic detection of the transducer carried by the vehicle owner, without that vehicle owner having necessarily to operate neither a button on a hand-held unit. Also, the receiver may be part of, or itself be, a proximity detection system that activates and illuminates the light module of this invention whenever the vehicle is approached under conditions where vehicle security is being detected and protected.

Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle. Signal light 32 is actuated on line 98 from either a turn indicator circuit 100 or a stop lamp indicator circuit 102, both of which are conventionally supplied with vehicle 40.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear or sensing of the speed of the vehicle, or the like. The lockout circuit may also be included in the vehicle's ignition system, such that the security light is disabled when the engine is started and the vehicle is operating. Thus, the lamp will be off when the ignition switch is turned to start the engine. Security lamp 30 is also actuated, in response to interior lighting device timeout circuit 96, whenever the interior lights of the vehicle are being actuated by timeout circuit 96, provided that lockout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors. Signal lamp 32 is actuated in response to turn indicator circuit 100 whenever the operator moves the indicator stick in the direction of that particular signal lamp 32. Signal lamp 32 may additionally be actuated from stop lamp circuit 102 in response to the driver actuating the vehicle's brakes.

In the embodiment illustrated in FIGS. 1 and 5, lens 64 of signal lamp 32 is adapted to filter the light provided from lamp 32 so as to be red and is provided for vehicles 40 in which the stop lamps and rear turn indicator lamps are, likewise, red. Because signal lamp 32 shines red, pattern 72 is restricted from extending forward of the vehicle. This is in order to comply with regulations prohibiting red lights from causing confusion with emergency vehicles by shining forward of the vehicle.

Figure 6:
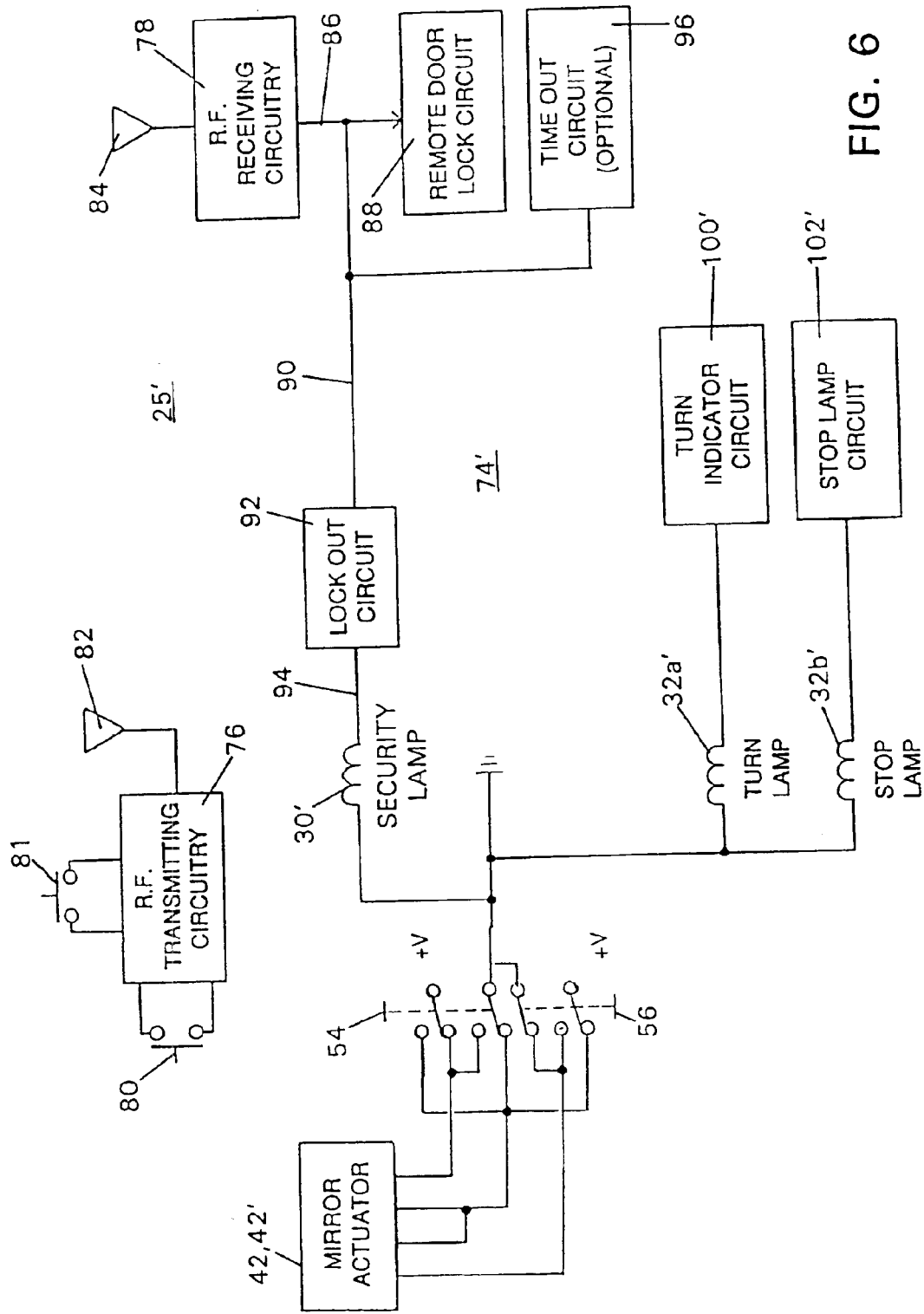
FIG. 6 is a block diagram of an alternative embodiment of a control system according to the invention.

For vehicles having red stoplights and amber turn indicators in the rear, a vehicle mirror security assembly 25' includes an exterior mirror assembly 26' and a control system 74' (FIGS. 4 and 6). Exterior mirror assembly 26' includes a security light 30', preferably white or clear, and a pair of signal lights 32a' and 32b'. Signal light 32a' is amber and is actuated directly from turn indicator circuit 100'. This amber color can be provided either by an amber light bulb or source, or a filtering lens providing an amber color. Signal light 32b' is red, red-orange or amber, as desired by the automaker, and is actuated directly from stop lamp circuit 102'. Each of the light patterns generated by signal lights 32a' and 32b' substantially correspond with light pattern 72. The light pattern generated by security light 30' is substantially equivalent to pattern 66. With the exception that turn signal indicator circuit 100' actuates signal light 32a' and stop lamp circuit 102' actuates signal light 32b', control system 74' operates substantially identically with control circuit 74.

In the illustrated embodiment, light source 60, for both security light 30 and signal light 32, may be supplied as a conventional incandescent or halogen lamp 60a (FIG. 7). Alternatively, a conventional incandescent fuse lamp 60b may be used (FIG. 16). Alternatively, a vacuum fluorescent lamp 60c, which is available in various colors, may be used (FIG. 17). Alternatively, a light-emitting diode 60d may be used (FIG. 18). As yet a further alternative, a fiber optic bundle 104 forming a light pipe may be positioned to discharge light behind lens 64. Fiber optic bundle 104 passes through breakaway joint 44 in wire-way 50 in order to transmit light from a source (not shown) within vehicle 40. By way of example, lens 64 may be supplied as a clear lens, a diffuser lens, a segmented lens, a prismatic lens, or a Fresnel lens in order to generate light patterns 66 and 72. Bracket 43 and breakaway joint 44 are marketed by Donnelly Corporation, the present assignee, of Holland, Mich. The remote actuator composed of remote transmitting device 76 and stationary receiving device 78 may be radio frequency coupled, as is conventional. Alternatively, they may be infrared coupled as illustrated in U.S. Pat. No. 4,258,352.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror. Although the invention is illustrated with breakaway joint 44, the invention may also be applied to mirrors that are rigidly mounted to the vehicle.

Figure 21:
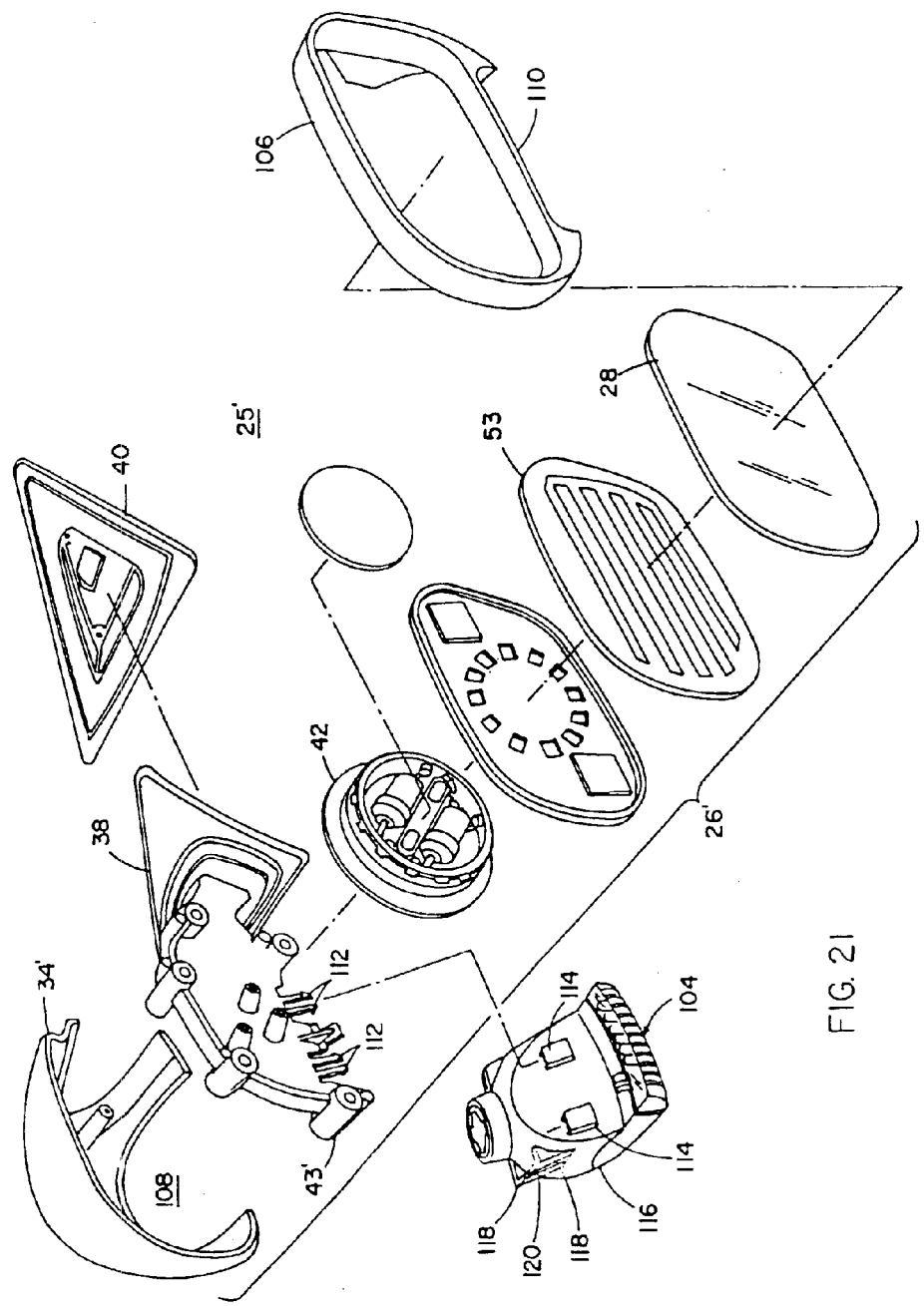
FIG. 21 is an exploded perspective view taken from the front of a mirror assembly (rear of the vehicle), according to another aspect of the invention.
Figure 22:
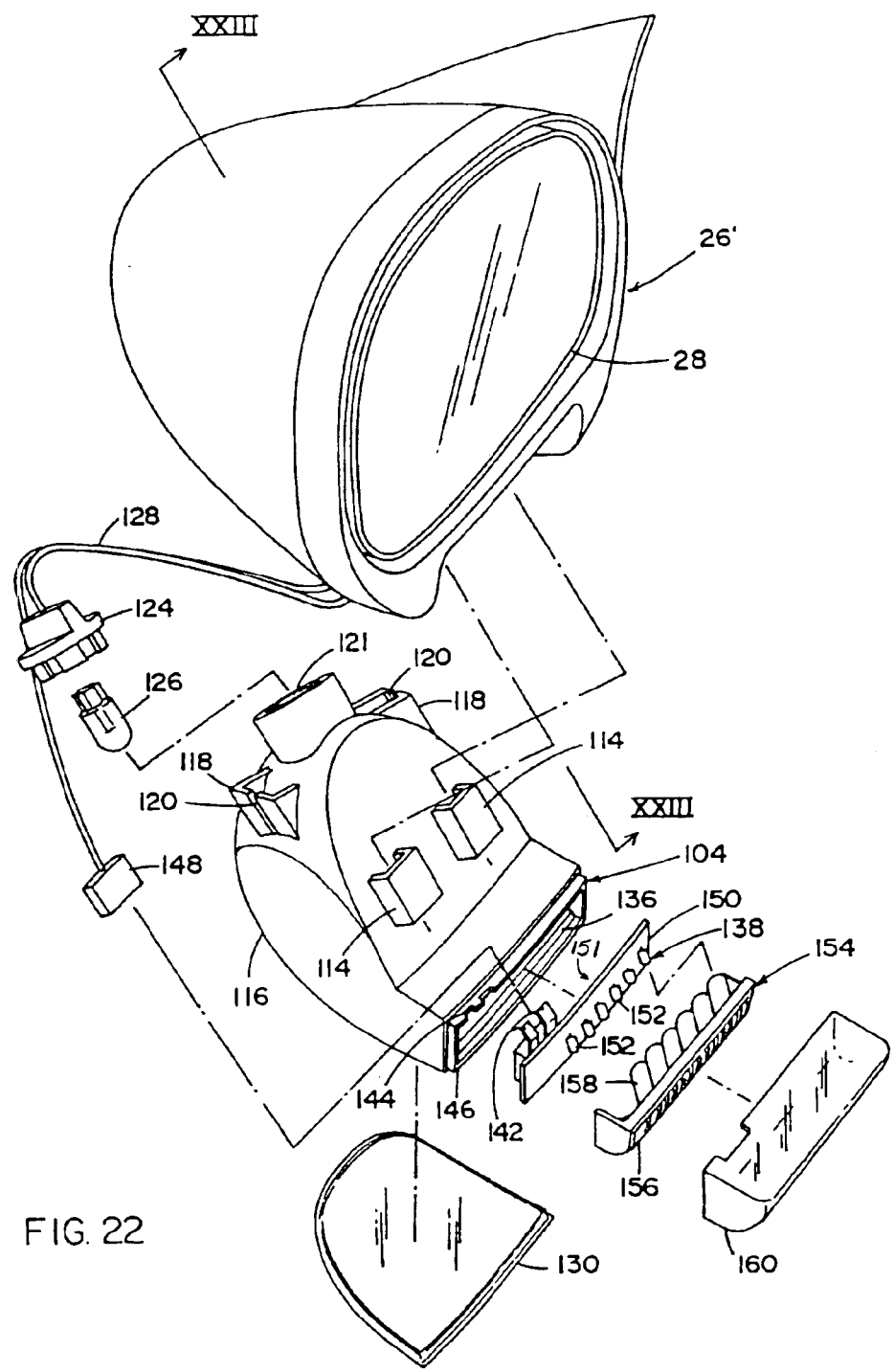
FIG. 22 is an exploded perspective view illustrating details of the light module.

An alternative vehicle personal security lighting system 25' includes a light module 104 that is removably positioned within housing 34' of exterior mirror assembly 26' (FIG. 21). In addition to the opening for accepting bezel or cowling 106, mirror housing 34' includes a downward opening 108 for receiving light module 104. Additionally, bezel 106 includes a recess 110 which defines an opening facing generally downwardly and rearwardly of the vehicle. Exterior mirror assembly 26 includes a bracket 43' for mounting positioning device 42 which mounts reflective element 28. Bracket 43' has two pairs of flexible prongs 112, which are received within sockets 114 defined on an enclosure 116 of light module 104. Prongs 112 releasably engage sockets 114 in order to retain the light module within the exterior mirror assembly in openings 108 and 110. Light module 104 may be disassembled from exterior mirror assembly 26' by reaching behind reflective element 28 with a pair of needle-nose pliers, or the like, and sequentially compressing each of the pairs of prongs 112 in order to release the prongs from sockets 114. Thus, prongs 112 and sockets 114 provide a fastener-less system which retains the light module in the exterior mirror assembly without the use of separate fasteners. A pair of shoulders 118, which define a slot 120 therebetween, engage a protrusion from an inner surface (not shown) of housing 34' in order to assist in stably positioning light module 104 within housing 34'. Alternatively, one or more fasteners, such as screws, clasps, latches, clips, and their like could be used. But, preferably, for ease of serviceability and for consumer acceptability, only one, and at most two, such fastener should be used. A further advantage of a fastener-less system is that it facilitates supply of a light module of this invention for use in a plurality of exterior mirror assemblies manufactured by a multitude of exterior mirror manufacturers with minimum modifications to the complete mirror assembly housing.

Unitary enclosure 116 has a generally downwardly directed light-transmitting opening 122 and an opening 121 for receiving a light socket 124. Light socket 124 provides electrical connection to a light source 126, which is electrically interconnected to the vehicle through a cable 128. The socket may be self-gasketing, achieved by selection of a material in its construction, at least at the mating surface, that achieves a sealing function. Preferably, the socket, either wholly, or partially at least at its mating surface, is a resilient, somewhat flexible polymer material, preferably with a durometer hardness, measured on the SHORE A scale of less than approximately 95, more preferably less than approximately 85, and most preferably less than approximately 75 but preferably of SHORE A hardness greater than about 50, and preferably greater than about 60. Materials appropriate to achieve this, and simultaneously have the physical, mechanical, and high temperature performance needed, include silicone, urethanes, thermoplastic rubbers, and polyvinyl chloride. Preferably, the material used for the self-gasketing socket is capable of withstanding temperatures in use in excess of approximately 200° F. or higher. Alternatively, a rigid construction may be used for the light socket, such as a ceramic, engineering plastic, Bakelite, nylon, polyester, filled polyester, or filled (glass and/or mineral) nylon, if a gasketing material delivering the above properties are used at the point of mating of light socket 124 and enclosure 116. Light socket 124 seals against enclosure 116 by the provision of a gasket, which, in the illustrated embodiment, is provided by the flexible nature of light socket 124. Alternatively, a separate gasket member formed of material such as silicone, neoprene, thermoplastic rubber, EPDM, polypropylene/EPDM alloy and similar elastomeric materials, preferably having the hardness properties listed above, could be inserted between the light socket and the enclosure. Light-transmitting opening 122 is covered by a cover member 130. Cover member 130 is a lens member, which affects the distribution of light emitted from light source 126. In the illustrated embodiment, cover member 130 is a clear optic lens that provides a substantially uniform puddle of light on the illuminated area adjacent the vehicle's door having a relatively wide light pattern, or flood pattern. Alternatively, cover member 130 could be a diffractive optic, a diffusive optic, a refractive optic, a reflective optic, a holographic optic, a binary optic, or a sinusoidal optic. In the illustrated embodiment, light source 126 is an incandescent lamp that is a filament optic having a minimum five-candle power. Such candle power mounted within an exterior mirror assembly of an automobile will preferably produce a ground surface illumination intensity of at least approximately 5 lux or greater, more preferably at least about 10 lux, and most preferably at least about 20 lux. Light source 126 may range in power up to 32-candle power or more. The preferred range is between approximately 5-candle power and approximately 15-candle power. It is desirable to provide as much candle power as possible without creating excessive heat within enclosure 116. If a high wattage lamp is used, a ventilation system is provided. Ventilation techniques are known in the art which allow the passage of air through the cavity 134 in which the light source is positioned while providing a substantially moisture-impervious barrier.

Light module 104 additionally includes a reflector 132 surrounding light source 126, both positioned in a cavity 134, which extends to light-transmitting opening 122. The purpose of the reflector is in order to direct the light from light source 126 into the pattern of light illustrated in FIGS. 10–12. Reflector 132 may be a parabolic reflector, as illustrated in FIG. 23, but may additionally include an extended tunnel in order to provide collimation of the light beam. In the illustrated embodiment, reflector 132 is aluminum or high efficiency aluminum vacuum-deposited on a wall 133 defining cavity 134, with an optional coating of lacquer. Alternatively, wall 133 may be coated with a white paint, such as "Argent" white or a silver paint. Reflector 132 may be a separate member, such as stamped metal or an aluminized glass optic. Alternatively, light source 126 and reflector 132 may be provided as an assembly.

Light module 104 includes a second cavity 140 defined in enclosure 116 and extending to a second light-transmitting opening 136. A signal light assembly 138 is positioned within cavity 140 to radiate light rearwardly with respect to the vehicle. Signal light assembly 138 includes a pair of electrical contacts 142, which protrude through grooves 144 defined in a flange 146 surrounding opening 136. Contacts 142 engage a connector 148, which provides electrical connection between signal light assembly 138 and the vehicle through cable 128 which, in turn, may piggyback or otherwise connect to existing 12-volt battery/ignition wiring already supplied in the housing to service an electrical actuator and/or a defroster heater pad.

Signal light assembly 138 includes a plurality of light-emitting diodes 152 positioned on circuit board 150. A variety of emitting sources may be used as light-emitting source 90, including, but not limited to, very high intensity amber and reddish-orange light-emitting diode (LED) sources, such as solid-state light-emitting diode (LED) sources utilizing double heterojunction AlGaAs/GaAs material technology, such as very high intensity red LED lamps T-1¾ (5 mm) HLMP-4100/4101, available from Hewlett Packard Corporation, Palo Alto, Calif., or which use transparent substrate aluminum indium gallium phosphide (AlInGaP) material technology, commercially available from Hewlett Packard Corporation, Palo Alto, Calif. under the designation T-1¾ (5 mm) HLMT-DL00, HLMT-CH00, HLMT-CL00, HLMT-CH15, HLMT-CL15 and HLMT-DH00 or high power AlInGaP amber and reddish-orange lamps under the designation HLMA-CH00/-CL00, HLMA-DG00/-DH00/-DL00, HLMA-EH20/-EL20, HLMA-KH00/-KL00, and HLMA-QH00/-QL00, or which use InGaAlP material technology available from Toshiba Corporation of Latham, N.Y., such as under the designation TLRH180D or GaAlAs/GaAlAs LED sources available from Sharp Corporation Electronics Components Group such as Model No. GL6UR31T and Model No. GL6UR3T which are red LEDs. Light emittance colors provided by such solid-state sources include orange, yellow, amber, red, and reddish-orange, desirably without need of ancillary spectral filters. The preferred solid-state light-emitting diodes, at 25° C. or thereabouts, operate at a forward voltage of about 2 volts to about 5 volts; have a luminous intensity (measured at the peak of the spacial radiation pattern which may not be aligned with the mechanical axis of the source package) of a minimum, at 20 mA current, of about 500 to about 5000 mcd (typical, about 700 to about 7000 mcd); operate at a forward current of about 20 mA to about 50 mA; emit with a dominant wavelength (CIE Chromaticity Diagram) of about 530 nm to about 680 nm; and have a viewing angle $2\Theta_{1/2}$ (where $\Theta_{1/2}$ is is the off-axis angle where the luminous intensity is one half the peak intensity) of about 5° to about 25°.

A lens assembly 154, which may be a polycarbonate or acrylic material, is positioned over signal light assembly 138. Lens assembly 154 may include a clear or sinusoidal optical surface 156 and a plurality of louvers 158. Louvers 158 and light-emitting diodes 152 are skewed away from the passenger compartment of the vehicle. In the illustrated embodiment, the light-emitting diodes and louvers are skewed at an angle of at least approximately 15°, more preferably approximately 20°, and most preferably approximately 25° to 30° from the longitudinal centerline of the vehicle, but preferably not more than about 45°. The purpose of the skewing is in order to allow the light radiated by the signal light assembly to be visible by drivers in vehicles to the side of vehicle 40, but to be shielded from the driver of the vehicle 40. This features prevents distraction to the driver of the vehicle equipped with the security lighting system. A cover member 160 encloses signal light assembly 138 and sinusoidal optical surface 156 by moisture-tight engagement with flange 146 of enclosure 116. In the illustrated embodiment, light-emitting diodes 152 are individually mounted at an angle on circuit board 150. In an alternative embodiment, light-emitting diodes 152 could be mounted upright, normal to circuit board 150, with the entire signal light assembly mounted at an angle with respect to the vehicle passenger compartment in order to provide proper skewing away from the driver of the vehicle equipped with the mirror assembly security system according to the invention. Also, when desired, a current limiting resistor can be mounted on circuit board 150 in series with the light-emitting diodes 152 to limit current therethrough and to mate to the 12-volt ignition/battery potential servicing the exterior mirror assembly.

Enclosure 116 is made from a heat-resistant material and is substantially moisture impervious. Preferably, a polymer material is used which has a heat distortion temperature (as measured by ASTM D 648 for a 12.7×12.7×6.4 mm specimen and at 1820 kPa) of at least approximately 80° C., more preferably at least approximately 100° C. and most preferably at least approximately 120° C. A mineral-filled or glass-filled nylon or polyester or acrylonitrile butadiene styrene (ABS) polymer may be utilized for enclosure 116. In the illustrated embodiment, enclosure 116 is made from polycarbonate with cover members 130 and 160 made from a polycarbonate or acrylic. The components of enclosure 116 may be assembled by conventional sonic welding, vibration welding, or by the use of suitable adhesives. Enclosure 116 is opaque, except for cover members 130 and 160, in order to shade light. The light module fits within the cavity defined within housing 34' by openings 108 and 110 in a manner which conforms to the styling and aerodynamic lines of the housing.

In an alternative embodiment illustrated in FIG. 25, a light module 104' is provided that includes a first downwardly directed light-transmitting opening 122 but does not include a rearwardly directed light-transmitting opening in the housing bezel. Light module 104' provides a puddle of light around the vehicle's doors, but does not include a signal light visible by drivers on the sides of the vehicle 40 equipped with light module 104'. In this manner, a mirror assembly security system, according to the invention, may be provided with a generally downwardly directed security light alone (104') or in combination with a signal light (104), which may illuminate in unison with the vehicle's turn signal, or brake lights, or both. Alternatively, signal light 104 may be provided as a stand-alone module packaged such as described herein and achieving the advantages in terms of modularity, ease of service/installation, weather resilience, etc., described herein. Thus, it is seen that the present invention provides an exceptionally flexible design which is easily adapted to various configurations desired by the vehicle manufacturers. Additionally, because the security system is provided in a unitary module having a unitary cover member/lens, the invention may be readily adapted to many vehicle housing designs without requiring extensive re-engineering of the vehicle exterior mirror housing.

Figure 26:
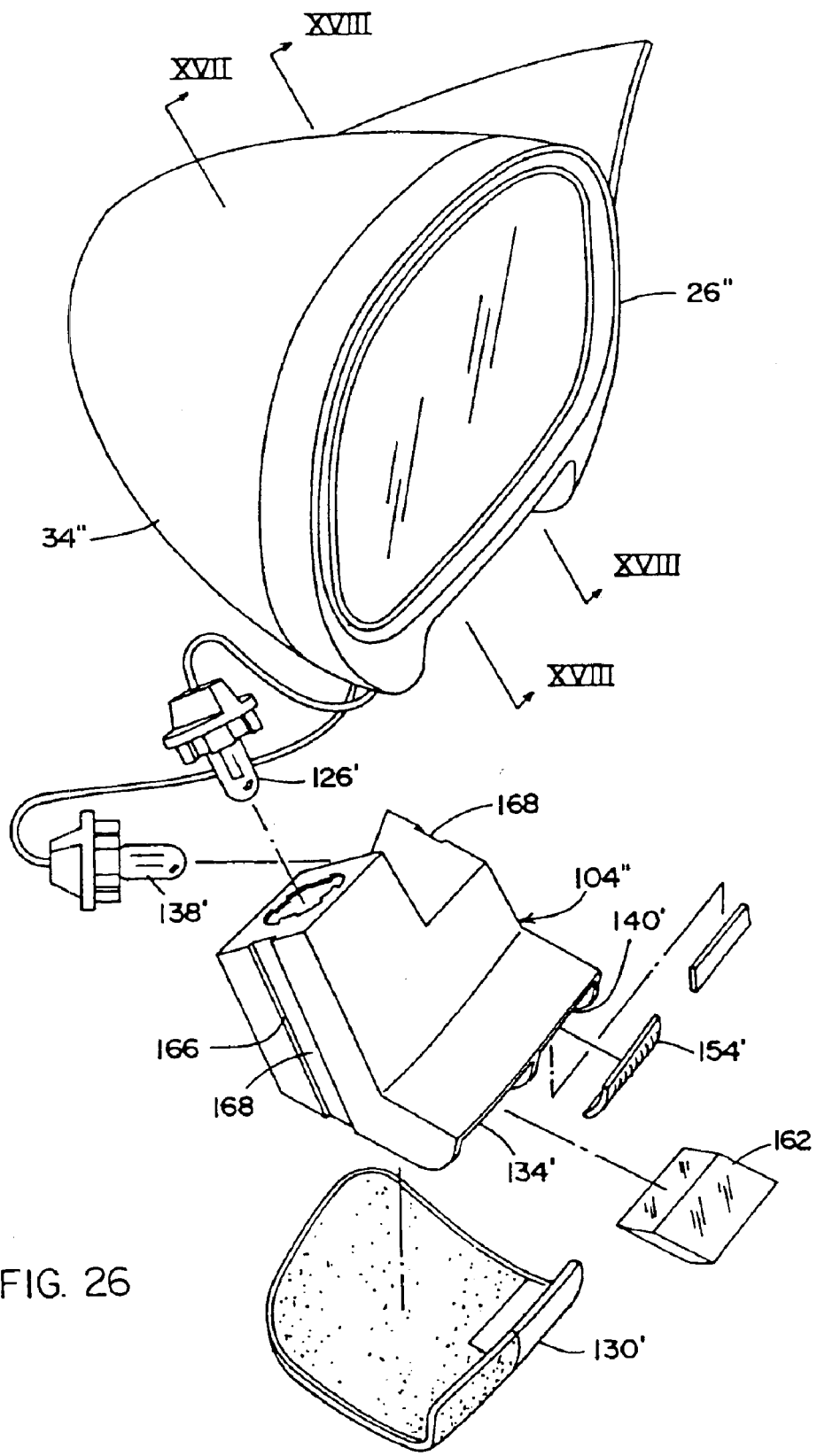
FIG. 26 is an exploded perspective view taken from the front of a mirror assembly of another alternative embodiment of the invention.
Figure 27:
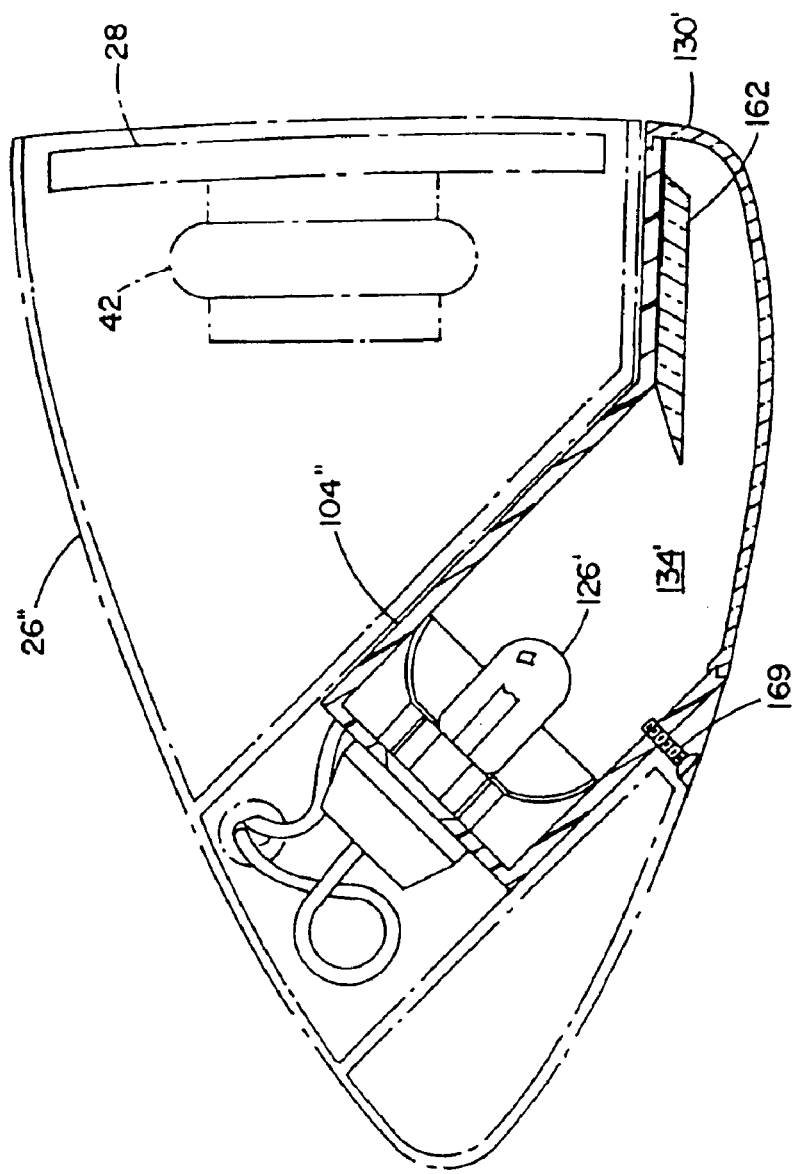
FIG. 27 is a sectional view taken along the lines XXVII—XXVII in FIG. 26.
Figure 28:
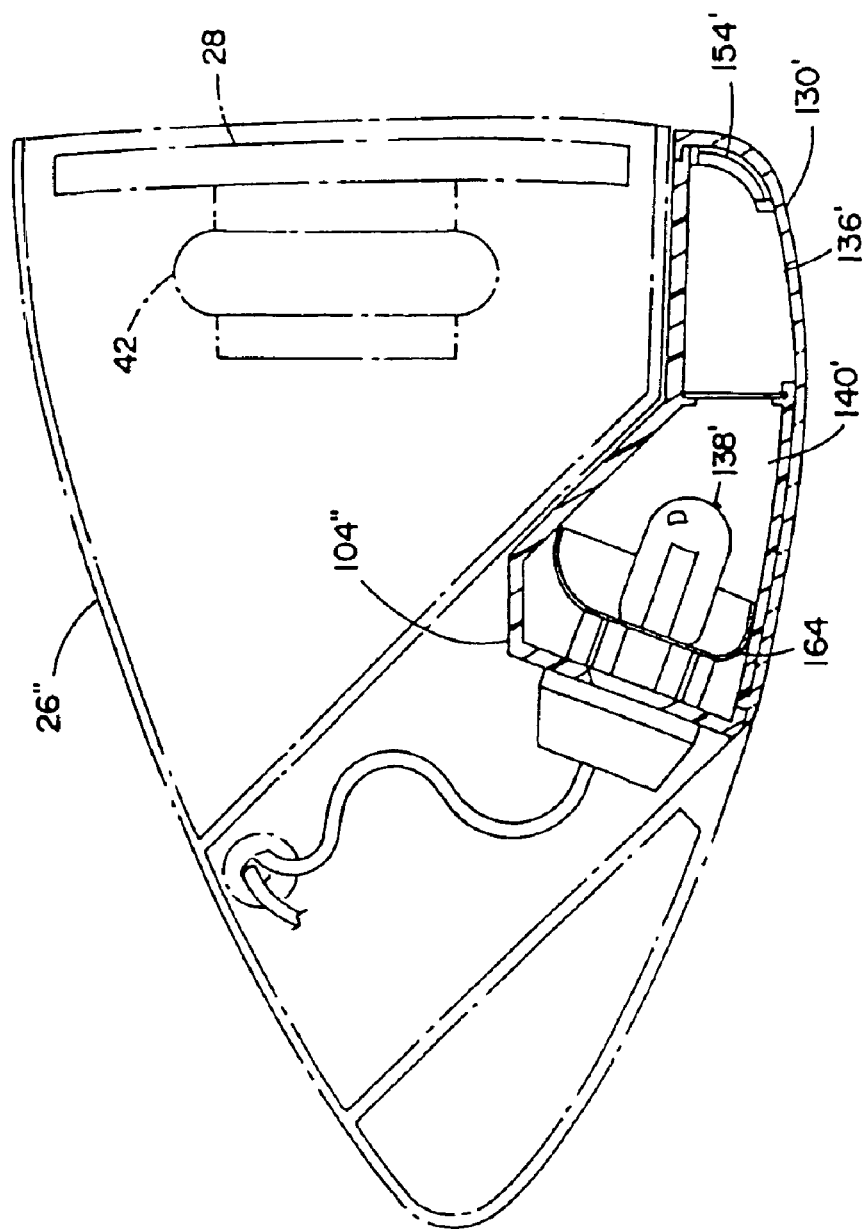
FIG. 28 is a sectional view taken along the lines XXVIII—XXVIII in FIG. 26.

In another embodiment, a light module 104" includes side-by-side cavities 134' and 140' (FIGS. 26–28). Cavity 134' terminates in a light-transmitting opening 122', which extends both downwardly and rearwardly with respect to the vehicle. A light-directing lens, or prism, 162 in cavity 134' captures a portion of the light radiated by light source 126' and directs it rearwardly of the vehicle. The puddle of light produced by light module 104" is capable of extending rearwardly of the vehicle because of the nature of light-transmitting opening 122' and the light redirecting effect of prism 162. The second cavity 140' in enclosure 116' includes a light-transmitting opening 136' which extends generally rearwardly of the vehicle. A light source 138' is positioned within cavity 140' and is surrounded by a reflector 164, which directs light through light-transmitting opening 136'. A diffuser assembly 154' includes an integral cover member and louvers in order to direct light radiated by light source 138' away from the passenger compartment of the vehicle equipped with light module 104". A unitary cover 130' extends over both openings 122' and 136'. Enclosure 116' includes a surface 166, which is configured with a groove 168, which mates with a tongue (not shown) in housing 34" of mirror assembly 36". The mating tongue-and-groove surface configuration is repeated on the surface of enclosure 116', which is opposite surface 166. The tongue-and-groove configuration at least partially retains light module 104" within housing 34" with a fastener, such as a threaded fastener 169, between an opening in housing 34" and extending into enclosure 116'. In the illustrated embodiment, light radiated from light source 126' through light-transmitting opening 122' provides a puddle of light adjacent the vehicle doors in order to produce a lighted security zone. The light radiated through light-transmitting opening 136 produced by light source 138' provides a signal indicator, which may be a turn signal indicator, or a brake signal indicator, or both a turn signal and brake signal indicator.

Figure 29:
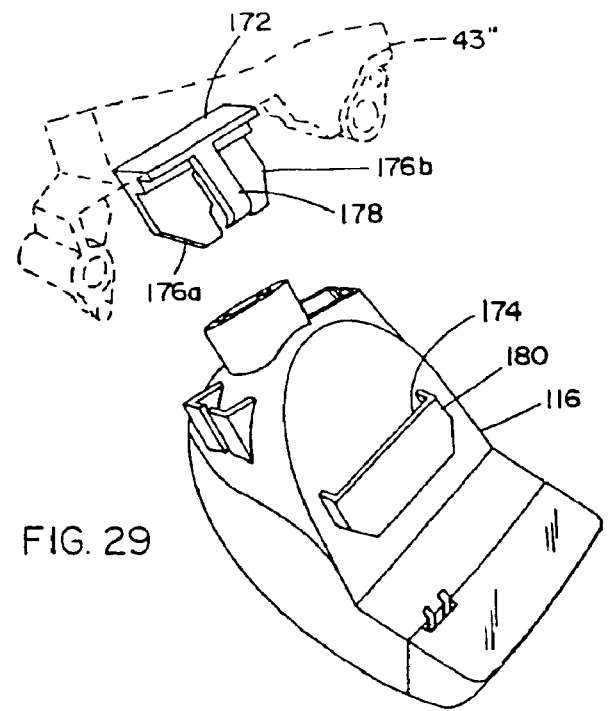
FIG. 29 is the same perspective view as FIG. 22 of another alternative embodiment.
Figure 30:
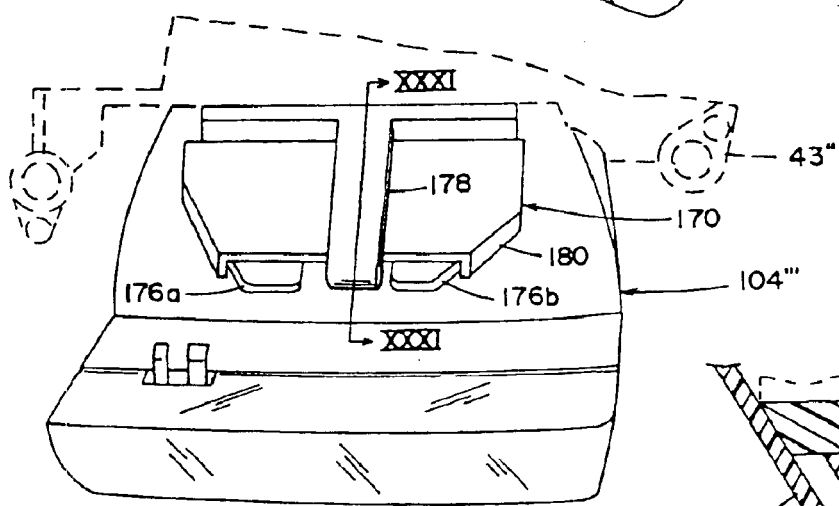
FIG. 30 is a front elevation of the mirror assembly in FIG. 29 illustrating the light module mounted to the support bracket.
Figure 31:
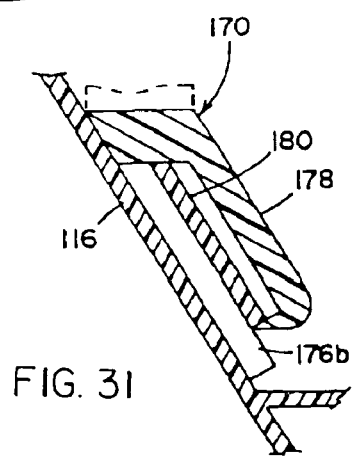
FIG. 31 is a sectional view taken along the lines XXXIII—XXXIII in FIG. 30.
Figure 32:
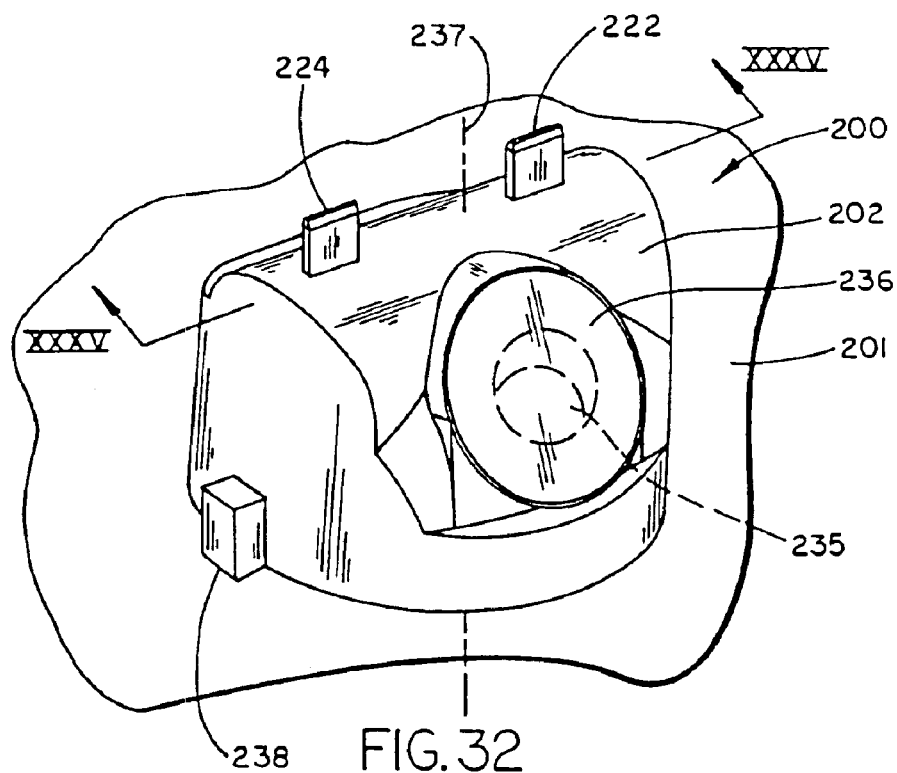
FIG. 32 is a perspective view of another preferred embodiment of the light module mounted to a surface of an exterior mirror assembly.
Figure 33:
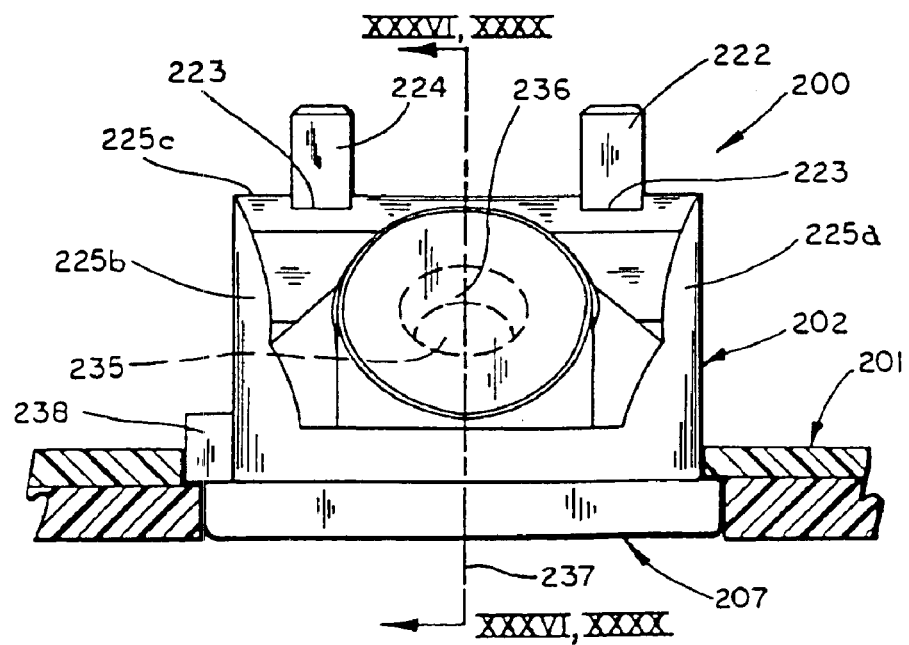
FIG. 33 is a front elevation of the light module of FIG. 32.

In another embodiment, a light module 104''' includes a removable fastenerless attachment system 170 including a first member 172 mounted to bracket 43" and a second member 174 mounted to enclosure 116' (FIGS. 29–31). First member 172 is a clip connector having a pair of guide members 176a, 176b and a retaining prong 178 overlaying the guide members. Second member 174 includes a wall 180 defining a doghouse type receiving connector. Guide members 176a, 176b assist the sliding entry of first member 172 into the cavity defined within wall 180 so that prong 178 engages the wall to retain the clip within the cavity.

With fastenerless attachment system 170, module 104" is easily and readily mounted by a simple insertion into the receiving opening in the mirror housing such that the first member is received by and engaged with the doghouse style receiving connector of the second member. To remove module 104''' for service, a tool, such as a flathead screwdriver, is inserted in the gap between the mirror element and the lamp module and prong 178 is raised, using a lift and twist motion, while the module is being pulled outwards from the mirror housing.

In a preferred embodiment, the lamp module of this invention incorporates a signal light that is a 12-watt #912 incandescent light source available from OSRAM/Sylvania, Hillsboro, N.H. (with about 12-candle power when operated at about 12.8 volts) mounted in a self-gasketing socket available from United Technologies Automotive, Detroit, Mich. under the trade name E25B-13A686-BA and fabricated of an electrical grade polyvinyl chloride injection molding compound such as to comply with Engineering Standard ESB-M4D317-A of Ford Motor Company, Dearborn, Mich., which is hereby incorporated herein by reference or from a thermoplastic rubber self-gasketing socket. The socket, in turn, is housed in a unitary enclosure, as described herein, fabricated of heat resistant polycarbonate supplied by General Electric Plastics, Woodstock, Ill. under the trade name ML4389 and meeting Ford Engineering Specification ESF-M4-D100-A, which is hereby incorporated herein by reference. The lens is made of acrylic supplied by General Electric Plastics under the 141–701 trade name. The LEDs in the signal light, of which six are used, are HLMA-DG00 high power AlInGa solid-state light-emitting diodes supplied by Hewlett Packard Corporation with a dominant wavelength at 622 nanometers, a peak wavelength at 630 nanometers, a 30° viewing angle, and a typical luminous efficiency, at 25° C., of 197 lumens/watt. When incorporated into an exterior mirror housing and mounted on a typical automobile, the ground illumination lamp height is approximately 30±5" from the ground surface, and, when operated at about 12 volts, the lamp light source illuminates an approximately 2-foot by 4-foot or thereabouts ground area adjacent the vehicle with a light level of at least about 10 lux and an average light level of preferably approximately 40 lux or more.

Light modules of this invention, including a ground illumination lamp and a signal light incorporated into an exterior mirror assembly, were mounted and driven on vehicles through a variety of driving conditions and through varied environmental exposure, and were found to have the performance and environmental resilience required by automakers so as to be suitable for commercial use on vehicles.

Although illustrated herein as being located along the bottom rim of the exterior trim housing, other locations are possible for the signal light of the invention, including the top and outboard rim of the exterior rim housing, and even elsewhere on the exterior vehicle body as appropriate.

Should it be desired to vary the intensity of the signal lights so they are brightest during high ambient lighting conditions, such as on a sunny day, but so that they are dimmer when ambient conditions are lower, such as at night, the intensity of signal light can be modulated using a photosensor such as a photoresistor, photodiode, phototransistor, or their like. A photosensor that controls the intensity of the signal light so that it reduces its intensity during low ambient light driving conditions, such as by pulse width modulation on the electrical line powering the LEDs in the signal light, may be mounted integrally with the lamp module itself, or it may be part of the vehicle electronics itself, such as a photosensor mounted as a part of an automatic electrochromic mirror circuit, as part of a vehicle automatic headlamp activation circuit, as part of a headlamp daylight running light control circuit, or their like.

Also, the concepts of this invention are applicable to a variety of exterior vehicular mirror assembly constructions, including one-part designs, uni-body constructions, and their like, as known in the exterior mirror assembly art. The concepts of the invention are applicable to a variety of assemblies including assemblies that use a bracket as a distinct internal structure and assemblies that do not use a bracket but rather are bracket-less assemblies where the housing itself serves as a structural element with means such as on the walls of the housing for securing an actuator and for receiving a lamp module.

Referring now to FIGS. 32–43, a self-contained, unitary light module 200 is shown mounted to a surface 201 of an exterior mirror assembly. The light module 200 includes an enclosure, housing 202, for supporting a light source 204, which radiates light through a light transmitting opening 206 formed in the housing 202, and a cover 207 for sealing the housing and for transmitting the light from the light source to a desired area near the vehicle to create a security zone. Preferably, the light should be directed generally rearwardly and downwardly in order to create a security zone in an area adjacent the doors through which passengers and the driver enter and exit the vehicle. It should be understood, that the security zone may comprise any area on or relatively near the vehicle. Housing 202 is made from a heat-resistant material and is substantially moisture impervious. Preferably, a polymer material is used which has a heat distortion temperature (as measured by ASTM D 648 for a 12.7×12.7×6.4 mm specimen and at 1820 kPa) of at least approximately 80° C., more preferably at least approximately 100° C., and most preferably at least approximately 120° C. A mineral-filled or glass-filled nylon or polyester or acrylonitrile butadiene styrene (ABS) polymer may be utilized for housing 202. In the illustrated embodiment, housing 202 is made from nylon and is preferably opaque in order to shade light. Module 200 is preferably mounted in an opening provided in the exterior mirror housing in a snap fit arrangement so that it can be quickly and easily removed from the mirror assembly. Alternatively, housing 202 may include a retaining structure, which cooperates with a groove or other retaining structure provided in the exterior mirror assembly. Preferably, the mounting is a fastener-less mounting arrangement to ease installation. Moreover, module 200 may be mounted in the exterior mirror housing in accordance with the mounting details described in reference to the previous embodiments of the invention.

Light source 204 is preferably a festoon lamp having an elongated light radiating surface 208 which extends between two frusto-conical end caps 210 and 212. End caps 210 and 212 provide electrical contacts for the lamp 204 and are supported by a pair of electrically conductive contacts 214 and 216 positioned in a compartment, or cavity, 219 of housing 202. Conductive contacts 214 and 216 are preferably brass stampings which include arms 218 and 220 for supporting light source 204 therebetween. Contacts 214 and 216 further include respective connector portions 222 and 224 which extend through openings 223 formed in wall 225 of housing 202 for connection to an external power supply. Preferably, connectors 222 and 224 connect to a control circuit such as control circuit 74, described in reference to the previous embodiments of the invention, in order to power light source 204.

Contacts 214 and 216 are directly supported by wall 225 of housing 202 and are preferably molded with the wall 225 and, most preferably, insert molded with end wall portions 225a and 225b and a back wall portion 225c. Support arms 218 and 220 of contacts 214 and 216 and end walls 225a and 225b of housing 202 are flexible and deflect when lamp 204 is inserted between the walls and between contact support arms 218 and 216. However, once cover 207 is mounted to housing 202, end walls 225a and 225b are held generally rigid by the cover and no longer deflect. Consequently, lamp 204 is rigidly secured between contacts 214 and 216 and between end walls 225a and 225b. These features provide added measures to minimize the effect of the vibration from the exterior mirror assembly.

Figure 34:
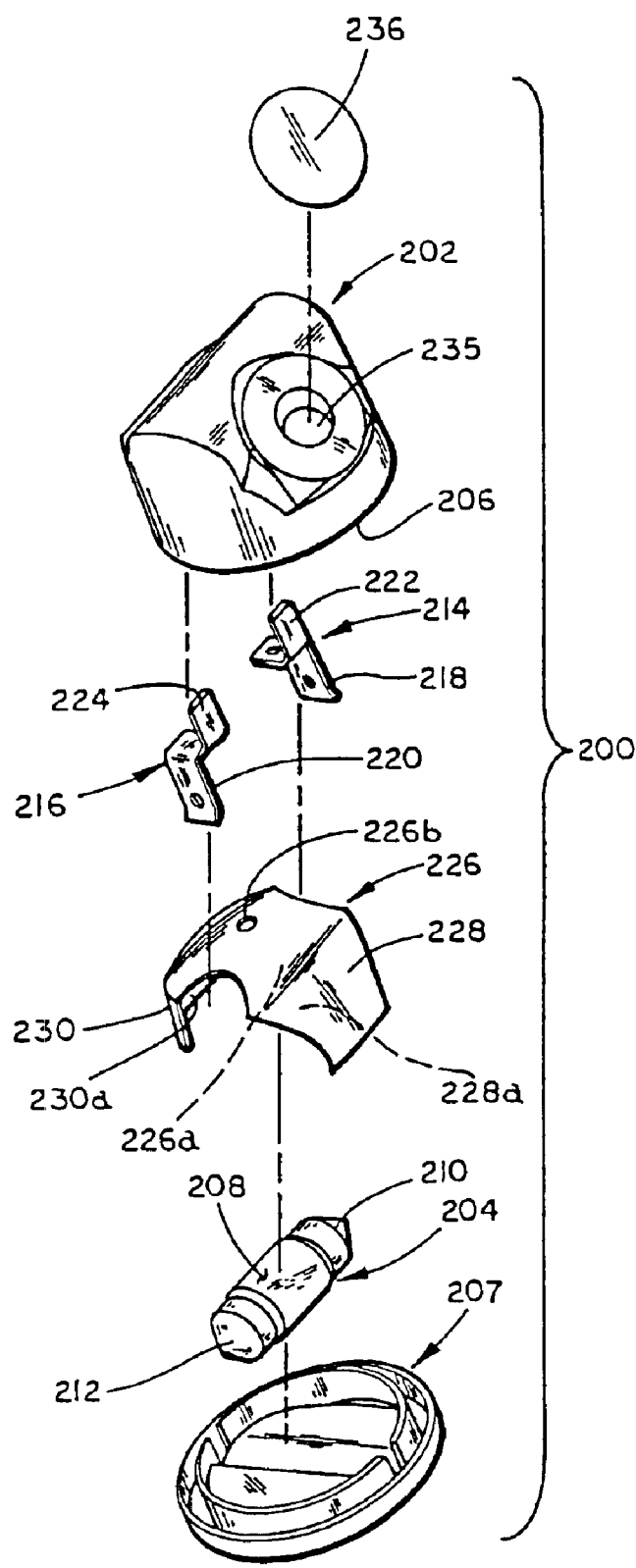
FIG. 34 is an exploded perspective view of the light module of FIG. 32.
Figure 35:
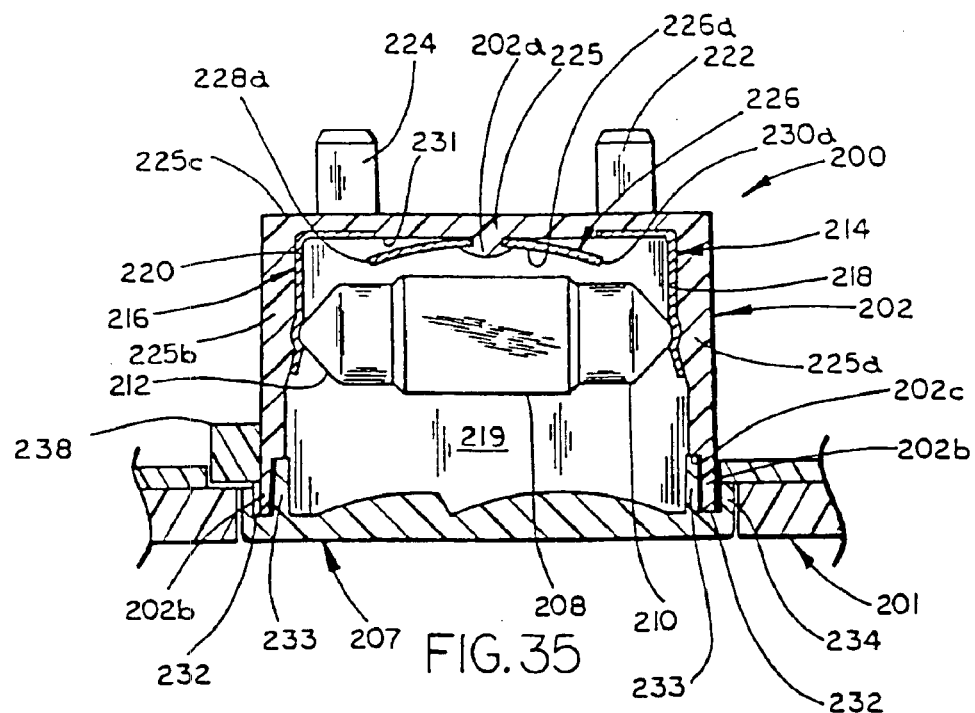
FIG. 35 is a cross-sectional view of the light module taken along line XXXV of FIG. 32.
Figure 36:
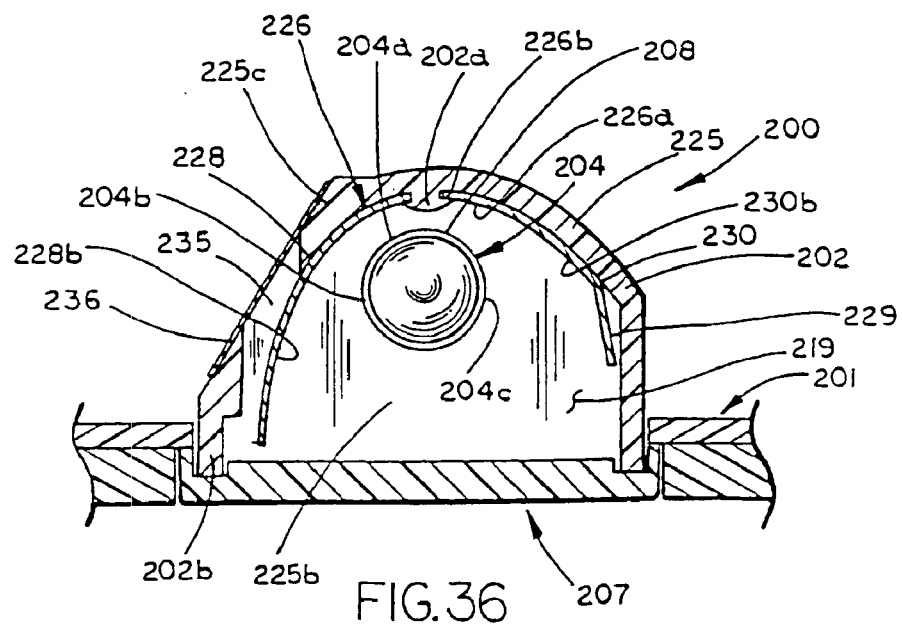
FIG. 36 is a cross-sectional view of the light module taken along line XXXVI of FIG. 33.
Figure 37:
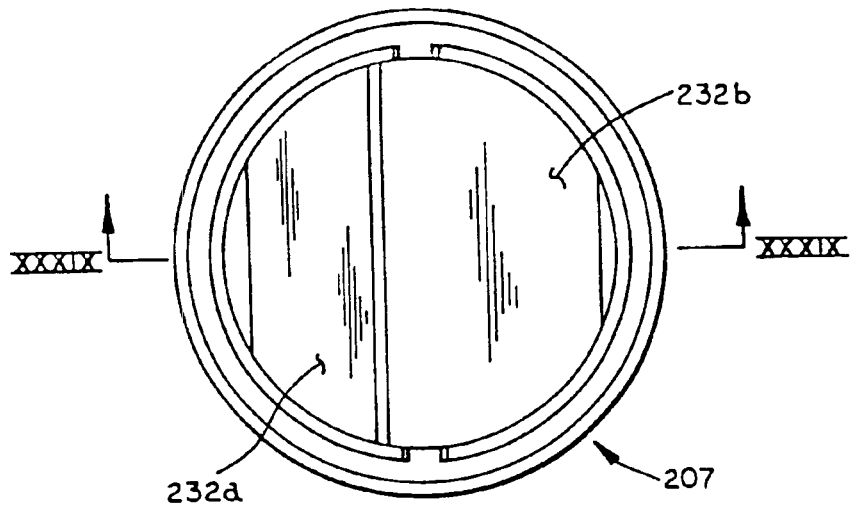
FIG. 37 is a plan view of a cover of the light module.
Figure 38:
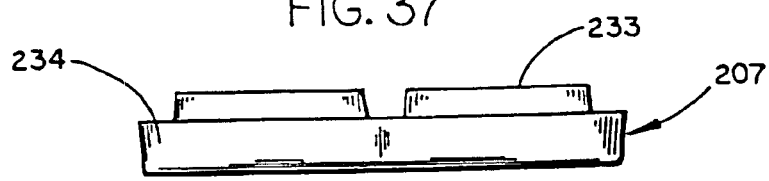
FIG. 38 is a cross sectional view taken along line XXXVIII of FIG. 37.
Figure 39:
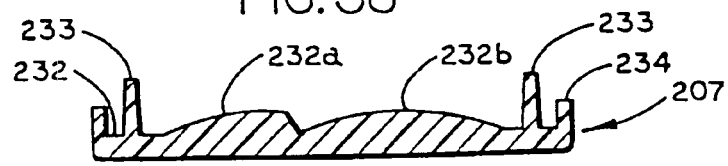
FIG. 39 is a cross sectional view taken along line XXXIX of FIG. 37.

In order to appropriately direct substantially all light that radiates from light source 204 out through opening 206, a reflective member 226 is provided. Reflective member 226 is preferably stamped anodized aluminum and comprises a domed, saddle-shape body with downwardly extending portions 228 and 230. As best seen in FIGS. 34 and 36, downwardly extending portions 228 and 230 of reflective member 226 partially surround light source 204 and include respective reflective surface 228b, 230b to reflect the light radiating from the back and sides of light source 204 toward the light transmitting opening 206. As can be seen in FIGS. 34 and 35, portions 228 and 230 straddle the frusto-conical ends 210 and 212 of lamp 204 so that the lamp 204 may be supported by contacts 214 and 216. Preferably, sides 228 and 230 have cut-out portions 228a and 230a to provide clearance for the frusto-conical ends 210 and 212 of the lamp 204. Reflective surfaces 228b and 230b are orientated to reflect the light radiating from the back surface 204a and side surfaces 204b, 204c of lamp 204 toward the opening 206 of housing 202. As can best be seen in FIG. 36, forward downwardly extending portion 228 extends further around lamp 204 than does rearward portion 230 so that more light is directed rearwardly of the vehicle. Side 230 also includes a relatively planar portion 229 to reflect light on to portion 228 to further direct more light rearwardly of the vehicle.

As can be seen in FIGS. 35 and 36, reflective member 226 includes a reflective inner surface 226a and is mounted to housing 202 through a mounting hole 226b, which is disposed on a top portion thereof. The perimeter of mounting hole 226b engages a heat stake 202a formed on the inner surface 231 of housing 202. Other conventional methods of attaching the reflective member 226 to the inner surface 231 of housing 202 are contemplated, such as a snap-fit arrangement; fasteners, such as screws; adhesives, or other conventionally known fastening techniques. In the embodiment shown in FIGS. 35 and 36, mounting hole 226b is located in a "non reflective zone"—an area where the reflected light merely reflects back on to the lamp. Reflective surface 226a may alternatively be formed on a piece of plastic having the general shape of the reflector member 226. In such alternative embodiment, a reflective surface is formed by vacuum metalizing aluminum onto an inwardly facing inner surface the piece of plastic.

Light module 200 further includes a cover 207 which extends over opening 206 and secures to the perimeter of housing 202. As best shown in FIGS. 34–39, cover 207 includes an annular recess 232 with annular upstanding flange portions 233 and 243 extending around the perimeter of cover 207. Cover 207 is polycarbonate in the illustrated embodiment, but may comprise acrylic or other suitable translucent material. Housing 202 includes a peripheral edge portion 202b which extends into recess 232 of cover 207. As best seen in FIGS. 35 and 36, peripheral edge portion 202b extends into recess 232 between flanges 233 and 234 and is secured therein by sonic or vibration welding or suitable adhesive, solvent bonding, or other suitable methods of sealing. Inner surface 231 of housing 202 includes an annular shoulder 202c to provide a better connection for sealing the cover 207 to housing 202. Preferably, the cover 207 is attached and sealed to housing 202 by sonic welding the outermost flange 234 to the exterior surface of housing 202. Alternatively, either flange may be fixed to respective surfaces on the housing by a suitable adhesive. Moreover, cover 207 may be attached to housing 202 by solvent bonding and other suitable methods of attachment that achieve a sealed connection between cover 207 and housing 202.

Cover 207 is preferably a molded lens member, which is adapted to further direct the distribution of light emitted from the light source 204 to a desired area near or adjacent the vehicle. In the illustrative embodiment shown in FIGS.

Figure 43:
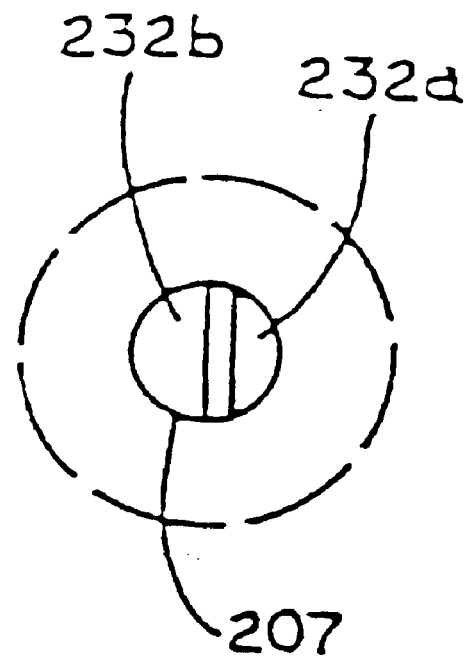
FIG. 43 is a plan view of a vehicle illustrating the orientation of the module in the respective left and right side exterior mirror assemblies of the vehicle.
Figure 43:
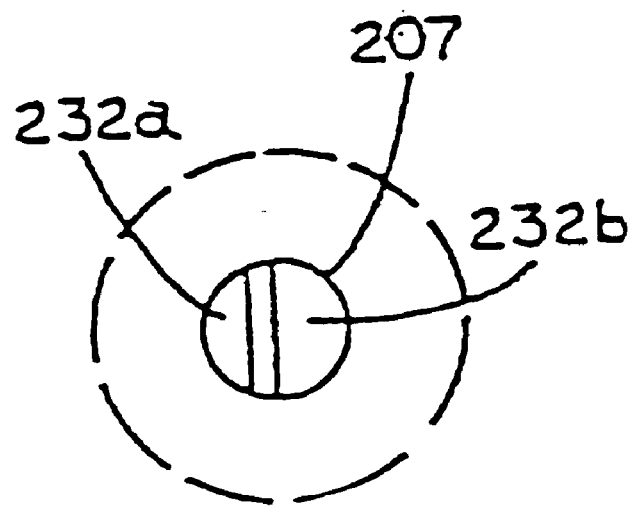

35–39, cover member 204 is a generally clear optic lens that includes two non-planar optical surfaces 232a and 232b to laterally collimate the light beam and thereby provide a more uniform lateral light pattern on the area adjacent the vehicle's door. Non-planar surface 232a may also be adapted to provide a slight increase in lateral outward orientation to the light pattern, with respect to the vehicle. In this manner, the security zone, which is generally wedge-shaped, as seen in FIG. 43, extends further from the area adjacent the door to an area offset from the door so that a large area in the general vicinity of the door is illuminated. Preferably, cover 207 is a Fresnel lens. Alternatively, cover member 207 may be a micro-Fresnel lens, a diffractive optic lens, an diffusive optic lens, a refractive optic lens, a reflective optic lens, a holographic optic lens, a binary optic lens, or a sinusoidal optic lens.

Light source 204, as described previously, is preferably a lamp with an elongated radiating surface. More preferably, lamp 204 comprises an incandescent festoon lamp having a filament with a minimum luminous intensity of approximately 5 mean spherical candela. Light source 204 may range in luminous intensity up to approximately 14 mean spherical candela. The preferred range of luminous intensity is between approximately 7 mean spherical candela and approximately 12 means spherical candela. Incandescent light source 204 may be a vacuum lamp or filled with a gas such as krypton, argon, xenon, or the like. It is desirable to provide as much candle power possible without creating excessive heat within the enclosure of housing 202. This allows the light module to create a security zone having an illumination range of between approximately 10 lux and approximately 40 lux.

In order to allow moisture to exit from enclosure 219, a vent aperture 235 is provided, which extends through housing wall 225 and preferably through side wall 225c of housing 202. Vent aperture 235 is covered by an adhesive vent patch 236 that permits discharge of the moisture from the enclosure but substantially blocks moisture from entering the enclosure. Preferably, vent patch 236 is made from GORTEX7 material. Vent aperture 235 may also provide a ventilation system by permitting passage of heat from the housing 202.

As described previously, light module 200 is preferably a self contained disposable light module. It is contemplated that the light source will not be replaceable and that the light module will be field replaceable as a unit. It is also preferably a universal light module having a unitary body which can be incorporated into many existing exterior mirror assemblies. The compact light module 200 preferably has a diameter of approximately one to one and a half inches (1 to 1½"), so that it may be inserted into most exterior mirror assembly styles. Moreover, light module 200 preferably has a volume of less than approximately 100 cubic centimeters. More preferably, light module 200 has a volume of less than approximately 70 cubic centimeters and, most preferably, a volume of less than approximately 50 cubic centimeters.

Housing 202 includes an open ended generally cylindrical body which extends around a central axis of orientation 237 for the housing and, consequently, defines a circular light transmitting opening 206 at the open end thereof. Central axis 237 is preferably orthogonal to the longitudinal axis of the vehicle. Because of its geometric shape, housing 202 can be oriented about central axis 237 without any apparent change in outward appearance. This feature in combination with its compact size allows the module to be inserted in any desired orientation in most any exterior mirror assembly without disturbing the aesthetic appeal of the exterior mirror assembly housing. As can be seen in FIG. 43, the same module 200 can be installed in either the right or the left exterior mirror assembly by reorientating the module about its central axis 237. In order to assure the proper orientation, housing 202 includes a positioning member, or key, 238 that provides a reference point on the housing 202 exterior so that the desired orientation may be determine.

Preferably, positioning member 238 comprises a projecting structure, such as a lug or a key, which projects outwardly from housing 202. Alternatively, positioning member may comprise a receiving structure, such as a notch. Similarly, exterior mirror assembly includes a structure, such as a key way or a notch, to mate with the positioning structure to orientate module 200 to a specific orientation for that particular mirror assembly.

Figure 40:
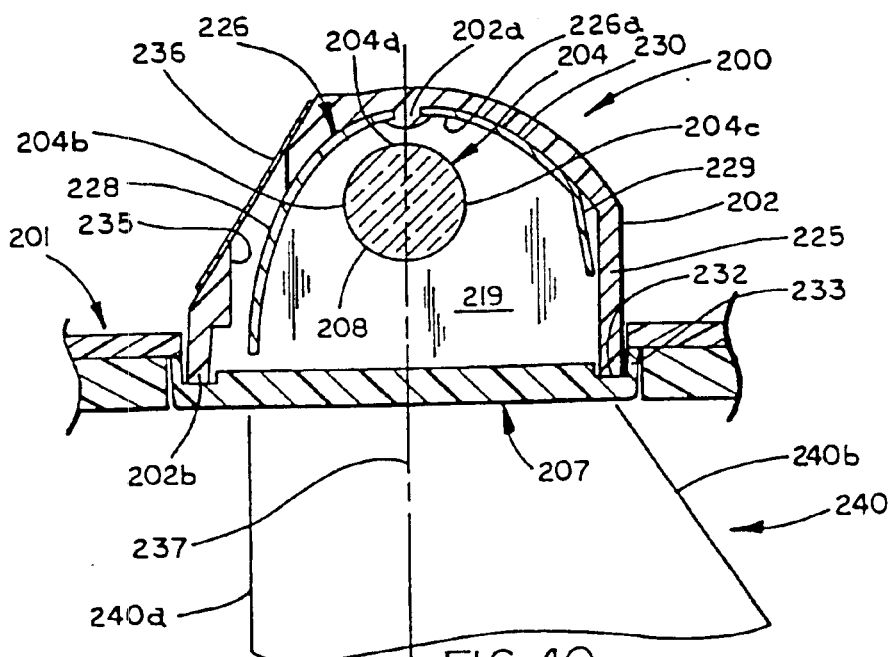
FIG. 40 is a cross-sectional view of the light module taken along line XXXX of FIG. 33 showing illustrating side elevational view of the light pattern produced by the module.

As illustrated in FIG. 40, a light pattern 240 emitted from the module, as would be seen from a side elevational of the vehicle, includes forward and rearward boundaries 240a and 240b which define the boundary of the light pattern 240. The boundaries of the this pattern are generally established by the curvature of reflective member 226 and by the length of portions 228 and 230. Consequently, the light pattern may be controlled as needed by configuring the shape and orientation of reflective member 226. Forward boundary 240a, as illustrated, is generally parallel with central axis 237 of module 200 to direct light generally downward with respect to the vehicle. Boundary 240b is angled with respect to central axis 237 in order to direct light rearwardly of the vehicle. In this manner, light pattern 240 is directed away from the central axis of the light chamber. This allows the light module to direct light generally rearwardly of the vehicle even though the light chamber axis is generally vertically oriented.

When viewed from above the vehicle, as in FIG. 43, light pattern 240 includes lateral boundaries 242a and 242b. When module 200 is mounted in the left hand mirror assembly, mirror boundary 242a is generally parallel with the vehicle's longitudinal axis 244 although some overlap with the vehicle side is desired. When the same module is installed in the right hand exterior mirror assembly and reorientated about its central axis 237, inner boundary 242a is generally parallel with the vehicle's longitudinal axis 244 on the left side of the vehicle, whereas, outer boundary 242b is angled with respect to longitudinal axis 244 in a counter-clockwise direction. As described above, the light pattern produced by module 200 can be reorientated to accommodate both sides of the vehicle by reorientating the module 200 about its central axis 37. The module can be oriented in both the right and left hand mirror assemblies to accommodate the different angles θ and φ formed respectively between the left hand mirrors and the vehicle axis.

Boundaries 242b may be desirably oriented even further laterally outwardly of the vehicle by reorienting the cover 207 one hundred and eighty (180) degrees about central axis 237 of the housing 202 from one side of the vehicle to the other side of the vehicle. This reorientation of the cover 207 would be performed during assembly, before the cover 207 is sealed onto housing 202. As best seen in FIG. 44, when cover 207 is oriented for installation of module 200 on the right hand side of the vehicle optical surface 232a is oriented toward the right as viewed from above. When ever 207 is oriented for installation of module 200 on the left side of the vehicle, optical surface 232a is oriented forward the left side of the vehicle. Thus it is seen that cover 207 may be independently oriented about the central axis 237 of the housing 202 to extend outwardly the outward lateral boundary 242b of the light pattern irrespective of which side of the vehicle light module 200 is positioned.

As can be seen in FIGS. 43 and 44, the angle between the two positions of the left handed and right handed light patterns is designated "A", in both cases, as measured from the left hand side of the vehicle in a counter clockwise direction, and is approximately 30°. More, preferably, the angle is in the range of approximately 5° to 30°.

Also, although desirably and preferably finding utility as a security light, the exterior mirror assembly light modules of this invention are also useful for other purposes such as providing for a courtesy exterior light and a general ground illumination light when such lighting may be desired such as when a door is opening, a key is inserted, or a keyboard entry is touched, or when approach of a person to a vehicle is detected such as by voice activation, proximity detection and their like. Also, light modules using the principles and concepts described herein could be provided for mounting on the vehicle other than within an exterior mirror assembly, such as under a door within a door well or under a door body panel so as to provide ground illumination directly under a door whenever said door is opened.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A mirror assembly security system suitable for use in a vehicle comprising:
    an exterior mirror assembly including a reflective element and a positioning device for adjustably positioning said reflective element;
    a light module positioned substantially within said assembly;
    said light module including an enclosure having a light-transmitting opening, said light-transmitting opening generally facing downward when said exterior mirror assembly is mounted to a side of the vehicle;
    said light module including a light source and including a light-directing surface;
    said light module projecting a pattern of light from a bottom portion of said assembly to illuminate a ground area adjacent the vehicle in order to create a lighted security zone when said light source is electrically powered;
    a light transmitting cover for said light-transmitting opening;
    said light transmitting cover comprising a lens;
    said light module configured to direct light downward and rearward of the vehicle when said exterior mirror assembly is mounted to a side of the vehicle and when said light source is electrically powered; and
    wherein said lens comprises at least one non-planar optical surface.

2. The mirror assembly security system of claim 1, wherein said light-directing surface at least partially surrounds said light source.

3. The mirror assembly security system in claim 2, further comprising a socket, said enclosure including a second opening, said socket being positioned in said second opening in said enclosure and including sealing means for sealing said socket in said second opening whereby said light source can be replaced by removing said light module from said exterior mirror assembly and removing said socket from said light module.

4. The mirror assembly security system in claim 1, wherein said at least one non-planar optical surface comprises two non-planar optical surfaces.

5. The mirror assembly security system in claim 1, wherein said light-directing surface is configured to direct light generally along a given axis, said axis generally facing downwardly and rearwardly of the vehicle.

6. The mirror assembly security system in claim 2, wherein said enclosure is at least partially disposed in said exterior mirror assembly behind said reflective element.

7. The mirror assembly security system in claim 1, wherein said lens comprises a refractive optic lens.

8. The mirror assembly security system in claim 1, wherein said lens comprises a lens selected from the group consisting of a diffusive optic lens, a diffractive optic lens, a refractive optic lens, a reflective optic lens, a holographic optic lens, a binary optic lens, a clear optic lens, and a sinusoidal optic lens.

9. The mirror assembly security system in claim 2, wherein said exterior mirror assembly and said enclosure include mating surface configurations, said mating surface configurations cooperating to at least partially retain said enclosure in said exterior mirror assembly.

10. The mirror assembly security system in claim 9, wherein said mating surface configurations comprise a tongue-and-groove configuration.

11. The mirror assembly security system in claim 9, wherein said mating surface configurations comprise at least one pair of deflectable prongs on one of said exterior mirror assembly and said enclosure and a socket on the other of said exterior mirror assembly and said enclosure, said deflectable prongs snap-fitting with said socket.

12. The mirror assembly security system in claim 9, wherein said mating surface configurations include at least one guide member and a deflectable clip on one of said exterior mirror assembly and said enclosure and a doghouse connector on the other of said exterior mirror assembly and said enclosure, said guide member and clip being retained by said doghouse connector.

13. The mirror assembly security system in claim 2, wherein said enclosure is made from a heat-resistant polymer.

14. The mirror assembly security system of claim 13, wherein said polymer has a heat distortion temperature of at least approximately 80° C.

15. The mirror assembly security system in claim 13, wherein said polymer is selected from the group consisting of polycarbonate, polyester, nylon, and ABS.

16. The mirror assembly security system in claim 1, wherein said light-directing surface comprises a metallic reflector surface.

17. The mirror assembly security system of claim 1, wherein said exterior mirror assembly comprises a driver-side exterior mirror assembly.

18. The mirror assembly security system of claim 2, wherein said reflective element comprises an electro-optic mirror.

19. The mirror assembly security system of claim 18, wherein said electro-optic mirror comprises an electrochromic mirror.

20. The mirror assembly security system of claim 19, wherein said electrochromic mirror comprises an electro-chemichromic mirror.

21. The mirror assembly security system of claim 3, wherein said sealing means comprises a polymer material having a durometer hardness of at least about 50 SHORE A.

22. The mirror assembly security system of claim 21, wherein said sealing means comprises a polymer material having a durometer hardness in a range of from about 50 to about 95 SHORE A.

23. The mirror assembly system of claim 3, wherein said socket is at least partially formed of a resilient polymer material so as to be self-gasketing at its mating surface to said enclosure.

24. The mirror assembly security system of claim 1, wherein said light module is inserted within said exterior mirror assembly through an opening in said bottom portion of said exterior mirror assembly.

25. The mirror assembly security system of claim 24, wherein said light module is positioned within said exterior mirror assembly in a manner that conforms to the styling and aerodynamic lines of said exterior mirror assembly.

26. The mirror assembly security system of claim 2, wherein said light module is inserted within said exterior mirror assembly through an opening in said bottom portion of said exterior mirror assembly.

27. The mirror assembly security system of claim 26, wherein said exterior mirror assembly includes a wall, said cover of said light module being substantially flush with said wall of said exterior mirror assembly.

28. The mirror assembly security system of claim 26, wherein said light module is removably attached by an attachment system.

29. The mirror assembly security system of claim 28, wherein said attachment system comprises a fastenerless system.

30. The mirror assembly security system of claim 29, wherein said fastenerless system comprises a doghouse style receiving connector.

31. The exterior rearview mirror system of claim 26, wherein said light module is removably attached using at least one fastener.

32. The exterior rearview mirror system of claim 31, wherein said at least one fastener comprises a member selected from the group consisting of a screw, a clasp, a latch, and a clip.

33. The exterior rearview mirror system of claim 31, wherein said at least one fastener comprises a screw.

34. The exterior rearview mirror system of claim 28, wherein said light module is removably attached using no more than two fasteners.

35. The exterior rearview mirror system of claim 34, wherein said no more than two fasteners are selected from the group consisting of screws, clasps, latches, and clips.

36. The exterior rearview mirror system of claim 34, wherein said no more than two fasteners comprise at least one screw.

37. The exterior rearview mirror system of claim 36, wherein said no more than two fasteners comprise two screws.

38. The mirror assembly security system of claim 2, wherein said light module is inserted within said exterior mirror assembly through an opening in said bottom portion of said exterior mirror assembly.

39. The mirror assembly security system of claim 38, wherein said exterior mirror assembly includes a wall, said cover of said light module being substantially flush with said wall of said exterior mirror assembly.

40. The mirror assembly security system of claim 1, wherein said enclosure includes first and second side walls and first and second electrical contacts, said first contact disposed on said first side wall, said second contact disposed on said second side wall and said contacts supporting said light source and for electrically coupling said light source to an external electrical power supply.

41. The mirror assembly security system of claim 40, wherein said light source comprises an elongated light radiating surface.

42. The mirror assembly security system of claim 40, wherein said light source comprises an incandescent light source.

43. The mirror assembly security system of claim 42, wherein said light source comprises an incandescent festoon light source.

44. The mirror assembly security system of claim 2, wherein said light module is removable from said exterior mirror assembly as a unit.

45. The mirror assembly security system of claim 2, wherein said enclosure has a volume that is less than approximately 100 cubic centimeters.

46. The mirror assembly security system of claim 2, wherein said ground area is illuminated with a light level less than approximately 40 lux.

47. The mirror assembly security system of claim 1, wherein said ground area is illuminated with a light level greater than approximately 10 lux.

48. The mirror assembly security system of claim 47, wherein said ground area is illuminated with a light level in the range of approximately 10 lux to approximately 40 lux.

49. A mirror assembly security system suitable for use in a vehicle comprising:
- an exterior mirror assembly including a reflective element and a positioning device for adjustably positioning said reflective element;
- a light module positioned substantially within said assembly;
- said light module including an enclosure having a light-transmitting opening, said light-transmitting opening generally facing downward when said exterior mirror assembly is mounted to a side of the vehicle;
- said light module including a light source and including a light-directing surface;
- said light module projecting a pattern of light from a bottom portion of said assembly to illuminate a ground area adjacent the vehicle in order to create a lighted security zone when said light source is electrically powered;
- a light transmitting cover for said light-transmitting opening;
- said light transmitting cover comprising a lens;
- said light module configured to direct light downward and rearward of the vehicle when said exterior mirror assembly is mounted to a side of the vehicle and when said light source is electrically powered;
- wherein said lens comprises at least one non-planar optical surface;
- wherein said light module is removable from said exterior mirror assembly as a unit; and
- wherein said light-directing surface at least partially surrounds said light source.

50. The mirror assembly security system of claim 49, wherein said light-directing surface comprises a metallic reflector surface.

51. The mirror assembly security system in claim 50, further comprising a socket, said enclosure including a second opening, said socket being positioned in said second opening in said enclosure and including sealing means for sealing said socket in said second opening whereby said light source can be replaced by removing said light module from said exterior mirror assembly and removing said socket from said light module.

52. The mirror assembly security system in claim 49, wherein said at least one non-planar optical surface comprises two non-planar optical surfaces.

53. The mirror assembly security system in claim 49, wherein said light-directing surface is configured to direct light generally along a given axis, said axis generally facing downwardly and rearwardly of the vehicle.

54. The mirror assembly security system in claim 50, wherein said enclosure is at least partially disposed in said exterior mirror assembly behind said reflective element.

55. The mirror assembly security system in claim 49, wherein said lens comprises a refractive optic lens.

56. The mirror assembly security system in claim 49, wherein said lens comprises a lens selected from the group consisting of a diffusive optic lens, a diffractive optic lens, a refractive optic lens, a reflective optic lens, a holographic optic lens, a binary optic lens, a clear optic lens, and a sinusoidal optic lens.

57. The mirror assembly security system in claim 50, wherein said exterior mirror assembly and said enclosure include mating surface configurations, said mating surface configurations cooperating to at least partially retain said enclosure in said exterior mirror assembly.

58. The mirror assembly security system in claim 57, wherein said mating surface configurations comprise a tongue-and-groove configuration.

59. The mirror assembly security system in claim 57, wherein said mating surface configurations comprise at least one pair of deflectable prongs on one of said exterior mirror assembly and said enclosure and a socket on the other of said exterior mirror assembly and said enclosure, said deflectable prongs snap-fitting with said socket.

60. The mirror assembly security system in claim 57, wherein said mating surface configurations include at least one guide member and a deflectable clip on one of said exterior mirror assembly and said enclosure and a doghouse connector on the other of said exterior mirror assembly and said enclosure, said guide member and clip being retained by said doghouse connector.

61. The mirror assembly security system in claim 50, wherein said enclosure is made from a heat-resistant polymer.

62. The mirror assembly security system of claim 61, wherein said polymer has a heat distortion temperature of at least approximately 80° C.

63. The mirror assembly security system in claim 61, wherein said polymer is selected from the group consisting of polycarbonate, polyester, nylon, and ABS.

64. The mirror assembly security system in claim 56, wherein said light-directing surface comprises a metallic reflector surface.

65. The mirror assembly security system of claim 49, wherein said exterior mirror assembly comprises a driver-side exterior mirror assembly.

66. The mirror assembly security system of claim 50, wherein said reflective element comprises an electro-optic mirror.

67. The mirror assembly security system of claim 66, wherein said electro-optic mirror comprises an electrochromic mirror.

68. The mirror assembly security system of claim 67, wherein said electrochromic mirror comprises an electro-chemichromic mirror.

69. The mirror assembly security system of claim 51, wherein said sealing means comprises a polymer material having a durometer hardness of at least about 50 SHORE A.

70. The mirror assembly security system of claim 69, wherein said sealing means comprises a polymer material having a durometer hardness in a range of from about 50 to about 95 SHORE A.

71. The mirror assembly system of claim 51, wherein said socket is at least partially formed of a resilient polymer material so as to be self-gasketing at its mating surface to said first enclosure.

72. The mirror assembly security system of claim 49, wherein said light module is inserted within said exterior mirror assembly through an opening in said bottom portion of said exterior mirror assembly.

73. The mirror assembly security system of claim 72, wherein said light module is positioned within said exterior mirror assembly in a manner that conforms to the styling and aerodynamic lines of said exterior mirror assembly.

74. The mirror assembly security system of claim 50, wherein said light module is inserted within said exterior mirror assembly through an opening in said bottom portion of said exterior mirror assembly.

75. The mirror assembly security system of claim 74, wherein said exterior mirror assembly includes a wall, said cover of said light module being substantially flush with said wall of said exterior mirror assembly.

76. The mirror assembly security system of claim 74, wherein said light module is removably attached by an attachment system.

77. The mirror assembly security system of claim 76, wherein said attachment system comprises a fastenerless system.

78. The mirror assembly security system of claim 77, wherein said fastenerless system comprises a doghouse style receiving connector.

79. The exterior rearview mirror system of claim 74, wherein said light module is removably attached using at least one fastener.

80. The exterior rearview mirror system of claim 79, wherein said at least one fastener comprises a member selected from the group consisting of a screw, a clasp, a latch, and a clip.

81. The exterior rearview mirror system of claim 79, wherein said at least one fastener comprises a screw.

82. The exterior rearview mirror system of claim 76, wherein said light module is removably attached using no more than two fasteners.

83. The exterior rearview mirror system of claim 82, wherein said no more than two fasteners are selected from the group consisting of screws, clasps, latches, and clips.

84. The exterior rearview mirror system of claim 82, wherein said no more than two fasteners comprise at least one screw.

85. The exterior rearview mirror system of claim 84, wherein said no more than two fasteners comprise two screws.

86. The mirror assembly security system of claim 50, wherein said light module is inserted within said exterior mirror assembly through an opening in said bottom portion of said exterior mirror assembly.

87. The mirror assembly security system of claim 86, wherein said exterior mirror assembly includes a wall, said cover of said light module being substantially flush with said wall of said exterior mirror assembly.

88. The mirror assembly security system of claim 49, wherein said enclosure includes first and second side walls and first and second electrical contacts, said first contact disposed on said first side wall, said second contact disposed on said second side wall and said contacts supporting said light source and for electrically coupling said light source to an external electrical power supply.

89. The mirror assembly security system of claim 88, wherein said light source comprises an elongated light radiating surface.

90. The mirror assembly security system of claim 88, wherein said light source comprises an incandescent light source.

91. The mirror assembly security system of claim 90, wherein said light source comprises an incandescent festoon light source.

92. The mirror assembly security system of claim 49, wherein said enclosure has a volume that is less than approximately 100 cubic centimeters.

93. The mirror assembly security system of claim 50, wherein said enclosure has a volume that is less than approximately 70 cubic centimeters.

94. The mirror assembly security system of claim 50, wherein said ground area is illuminated with a light level less than approximately 40 lux.

95. The mirror assembly security system of claim 49, wherein said ground area is illuminated with a light level greater than approximately 10 lux.

96. The mirror assembly security system of claim 95, wherein said ground area is illuminated with a light level in the range of approximately 10 lux to approximately 40 lux.

97. A mirror assembly security system suitable for use in a vehicle comprising:

an exterior mirror assembly including a reflective element and a positioning device for adjustably positioning said reflective element;

a light module positioned substantially within said assembly;

said light module including an enclosure having a light-transmitting opening, said light-transmitting opening generally facing downward when said exterior mirror assembly is mounted to a side of the vehicle;

said light module including a light source and including a light-directing surface;

said light module projecting a pattern of light from a bottom portion of said assembly to illuminate a ground area adjacent the vehicle in order to create a lighted security zone when said light source is electrically powered;

a light transmitting cover for said light-transmitting opening;

said light transmitting cover comprising a lens;

said light module configured to direct light downward and rearward of the vehicle when said exterior mirror assembly is mounted to a side of the vehicle and when said light source is electrically powered;

wherein said lens comprises a lens selected from the group consisting of a diffusive optic lens, a diffractive optic lens, a refractive optic lens, a reflective optic lens, a holographic optic lens, a binary optic lens, a clear optic lens, and a sinusoidal optic lens; and wherein said enclosure has a volume that is less than approximately 100 cubic centimeters.

98. The mirror assembly security system of claim 97, wherein said light-directing surface comprises a metallic reflector surface.

99. The mirror assembly security system in claim 98, further comprising a socket, said enclosure including a second opening, said socket being positioned in said second opening in said enclosure and including sealing means for sealing said socket in said second opening whereby said light source can be replaced by removing said light module from said exterior mirror assembly and removing said socket from said light module.

100. The mirror assembly security system in claim 97, wherein said lens comprises two non-planar optical surfaces.

101. The mirror assembly security system in claim 97, wherein said light-directing surface is configured to direct light generally along a given axis, said axis generally facing downwardly and rearwardly of the vehicle.

102. The mirror assembly security system in claim 98, wherein said enclosure is at least partially disposed in said exterior mirror assembly behind said reflective element.

103. The mirror assembly security system in claim 97, wherein said lens comprises a refractive optic lens.

104. The mirror assembly security system in claim 97, wherein said lens comprises at least one non-planar optical surface.

105. The mirror assembly security system in claim 98, wherein said exterior mirror assembly and said enclosure include mating surface configurations, said mating surface configurations cooperating to at least partially retain said enclosure in said exterior mirror assembly.

106. The mirror assembly security system in claim 105, wherein said mating surface configurations comprise a tongue-and-groove configuration.

107. The mirror assembly security system in claim 105, wherein said mating surface configurations comprise at least one pair of deflectable prongs on one of said exterior mirror assembly and said enclosure and a socket on the other of said exterior mirror assembly and said enclosure, said deflectable prongs snap-fitting with said socket.

108. The mirror assembly security system in claim 105, wherein said mating surface configurations include at least one guide member and a deflectable clip on one of said exterior mirror assembly and said enclosure and a doghouse connector on the other of said exterior mirror assembly and said enclosure, said guide member and clip being retained by said doghouse connector.

109. The mirror assembly security system in claim 98, wherein said enclosure is made from a heat-resistant polymer.

110. The mirror assembly security system of claim 109, wherein said polymer has a heat distortion temperature of at least approximately 80° C.

111. The mirror assembly security system in claim 109, wherein said polymer is selected from the group consisting of polycarbonate, polyester, nylon, and ABS.

112. The mirror assembly security system in claim 104, wherein said light-directing surface comprises a metallic reflector surface.

113. The mirror assembly security system of claim 97, wherein said exterior mirror assembly comprises a driver-side exterior mirror assembly.

114. The mirror assembly security system of claim 98, wherein said reflective element comprises an electro-optic mirror.

115. The mirror assembly security system of claim 114, wherein said electro-optic mirror comprises an electrochromic mirror.

116. The mirror assembly security system of claim 115, wherein said electrochromic mirror comprises an electro-chemichromic mirror.

117. The mirror assembly security system of claim 99, wherein said sealing means comprises a polymer material having a durometer hardness of at least about 50 SHORE A.

118. The mirror assembly security system of claim 117, wherein said sealing means comprises a polymer material having a durometer hardness in a range of from about 50 to about 95 SHORE A.

119. The mirror assembly system of claim 99, wherein said socket is at least partially formed of a resilient polymer material so as to be self-gasketing at its mating surface to said first enclosure.

120. The mirror assembly security system of claim 97, wherein said light module is inserted within said exterior mirror assembly through an opening in said bottom portion of said exterior mirror assembly.

121. The mirror assembly security system of claim 120, wherein said light module is positioned within said exterior mirror assembly in a manner that conforms to the styling and aerodynamic lines of said exterior mirror assembly.

122. The mirror assembly security system of claim 98, wherein said light module is inserted within said exterior mirror assembly through an opening in said bottom portion of said exterior mirror assembly.

123. The mirror assembly security system of claim 122, wherein said exterior mirror assembly includes a wall, said cover of said light module being substantially flush with said wall of said exterior mirror assembly.

124. The mirror assembly security system of claim 122, wherein said light module is removably attached by an attachment system.

125. The mirror assembly security system of claim 124, wherein said attachment system comprises a fastenerless system.

126. The mirror assembly security system of claim 125, wherein said fastenerless system comprises a doghouse style receiving connector.

127. The exterior rearview mirror system of claim 122, wherein said light module is removably attached using at least one fastener.

128. The exterior rearview mirror system of claim 127, wherein said at least one fastener comprises a member selected from the group consisting of a screw, a clasp, a latch, and a clip.

129. The exterior rearview mirror system of claim 127, wherein said at least one fastener comprises a screw.

130. The exterior rearview mirror system of claim 124, wherein said light module is removably attached using no more than two fasteners.

131. The exterior rearview mirror system of claim 130, wherein said no more than two fasteners are selected from the group consisting of screws, clasps, latches, and clips.

132. The exterior rearview mirror system of claim 130, wherein said no more than two fasteners comprise at least one screw.

133. The exterior rearview mirror system of claim 132, wherein said no more than two fasteners comprise two screws.

134. The mirror assembly security system of claim 98, wherein said light module is inserted within said exterior mirror assembly through an opening in said bottom portion of said exterior mirror assembly.

135. The mirror assembly security system of claim 134, wherein said exterior mirror assembly includes a wall, said cover of said light module being substantially flush with said wall of said exterior mirror assembly.

136. The mirror assembly security system of claim 97, wherein said enclosure includes first and second side walls and first and second electrical contacts, said first contact disposed on said first side wall, said second contact disposed on said second side wall and said contacts supporting said light source and for electrically coupling said light source to an external electrical power supply.

137. The mirror assembly security system of claim 136, wherein said light source comprises an elongated light radiating surface.

138. The mirror assembly security system of claim 136, wherein said light source comprises an incandescent light source.

139. The mirror assembly security system of claim 138, wherein said light source comprises an incandescent festoon light source.

140. The mirror assembly security system of claim 97, wherein said enclosure has a volume that is less than approximately 70 cubic centimeters.

141. The mirror assembly security system of claim 98, wherein said enclosure has a volume that is less than approximately 50 cubic centimeters.

142. The mirror assembly security system of claim 98, wherein said ground area is illuminated with a light level less than approximately 40 lux.

143. The mirror assembly security system of claim 97, wherein said ground area is illuminated with a light level greater than approximately 10 lux.

144. The mirror assembly security system of claim 143, wherein said ground area is illuminated with a light level in the range of approximately 10 lux to approximately 40 lux.

\* \* \* \* \*

UNITED STATES PATENT AND TRADEMARK OFFICE
CERTIFICATE OF CORRECTION

PATENT NO. : 6,902,306 B2 Page 1 of 1
APPLICATION NO. : 10/797390
DATED : June 7, 2005
INVENTOR(S) : Todd W. Pastrick et al.

It is certified that error appears in the above-identified patent and that said Letters Patent is hereby corrected as shown below:

Column 11:
Line 60, Delete --is-- in the first occurrence.

Column 13:
Line 50, "104" " should be --104' "--.

Signed and Sealed this

Eighteenth Day of July, 2006

JON W. DUDAS
*Director of the United States Patent and Trademark Office*